United States Patent
Li et al.

(10) Patent No.: US 10,122,655 B2
(45) Date of Patent: *Nov. 6, 2018

(54) PERSONALIZING DATA SYSTEM COMPONENTS AND DATA SOURCES AS CHATBOTS IN A GROUP CHAT SESSION

(71) Applicant: International Business Machines Corporation, Armonk, NY (US)

(72) Inventors: Jeff J. Li, Parkland, FL (US); Ivan M. Milman, Austin, TX (US); Wendi L. Nusbickel, Boca Raton, FL (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/702,096

(22) Filed: May 1, 2015

(65) Prior Publication Data

US 2016/0094492 A1 Mar. 31, 2016

Related U.S. Application Data

(63) Continuation of application No. 14/499,984, filed on Sep. 29, 2014.

(51) Int. Cl.
*G06F 15/16* (2006.01)
*H04L 12/58* (2006.01)
*H04L 12/18* (2006.01)

(52) U.S. Cl.
CPC .............. *H04L 51/02* (2013.01); *H04L 51/04* (2013.01); *H04L 12/1813* (2013.01)

(58) Field of Classification Search
CPC .......................... H04L 51/02; H04L 12/1813
USPC ........................................................ 709/206
See application file for complete search history.

(56) References Cited

U.S. PATENT DOCUMENTS

| | | |
|---|---|---|
| 7,454,433 B2 | 11/2008 | Ebert |
| 7,996,462 B2 | 8/2011 | Degenhardt et al. |
| 8,200,710 B2 | 6/2012 | Sagi et al. |
| 8,250,192 B2 | 8/2012 | Bowerman |
| 8,285,652 B2 | 10/2012 | Biggs et al. |
| 2003/0220972 A1* | 11/2003 | Montet ............... H04L 51/04 709/204 |

(Continued)

FOREIGN PATENT DOCUMENTS

| | | |
|---|---|---|
| EP | 1365553 A1 | 11/2003 |
| WO | 2013032913 A1 | 3/2013 |

OTHER PUBLICATIONS

M. M. I. Awad and M. S. Abdullah, "A framework for interoperable distributed ETL components based on SOA," 2010 2nd International Conference on Software Technology and Engineering, San Juan, PR, 2010, pp. V1-67-V1-70.*

(Continued)

*Primary Examiner* — Taylor Elfervig
(74) *Attorney, Agent, or Firm* — Janaki K. Davda; Konrad, Raynes, Davda & Victor LLP

(57) ABSTRACT

Provided are techniques for personalizing data system components and data sources as chatbots in a group chat session. A social media gateway interface with a chat adapter for a chat application is provided. One or more chatbots that each represent a corresponding component of a data system are created. The one or more chatbots and the chatbot adapter are used to manage each corresponding component of the data system.

10 Claims, 17 Drawing Sheets

(56) References Cited

U.S. PATENT DOCUMENTS

| | | | |
|---|---|---|---|
| 2004/0030750 | A1* | 2/2004 | Moore .................. H04L 12/14 709/204 |
| 2006/0026231 | A1 | 2/2006 | Degenhardt et al. |
| 2007/0136324 | A1 | 6/2007 | Xu et al. |
| 2008/0120380 | A1 | 5/2008 | Boyd et al. |
| 2009/0158278 | A1* | 6/2009 | De-Kay .................. H04L 67/10 718/100 |
| 2009/0254670 | A1 | 10/2009 | Kim et al. |
| 2009/0327416 | A1* | 12/2009 | Mankovski ........... G06F 15/163 709/204 |
| 2011/0078105 | A1 | 3/2011 | Wallace |
| 2011/0213642 | A1 | 9/2011 | Makar et al. |
| 2011/0238766 | A1 | 9/2011 | Lew et al. |
| 2012/0041903 | A1* | 2/2012 | Beilby .................. G06N 3/004 706/11 |
| 2012/0059896 | A1 | 3/2012 | Li |
| 2012/0063388 | A1 | 3/2012 | Ruparelia et al. |
| 2012/0066738 | A1 | 3/2012 | Cohan |
| 2012/0089562 | A1 | 4/2012 | Deremigio et al. |
| 2012/0095835 | A1 | 4/2012 | Makar et al. |
| 2012/0198036 | A1 | 8/2012 | Korovin et al. |
| 2012/0216125 | A1 | 8/2012 | Pierce |
| 2012/0246110 | A1 | 9/2012 | Fischer |
| 2012/0260263 | A1 | 10/2012 | Edoja |
| 2012/0317482 | A1 | 12/2012 | Barraclough et al. |
| 2013/0019262 | A1 | 1/2013 | Bhatia et al. |
| 2013/0166721 | A1 | 6/2013 | Soffer et al. |
| 2014/0122083 | A1* | 5/2014 | Xiaojiang ............... H04L 51/02 704/270.1 |
| 2014/0280494 | A1 | 9/2014 | Samoylenko et al. |
| 2014/0358612 | A1* | 12/2014 | Sri .................. G06Q 10/063114 705/7.15 |
| 2014/0359027 | A1* | 12/2014 | Pujare .................... H04L 51/36 709/206 |

OTHER PUBLICATIONS

P. Manoonpong, T. Geng and F. Worgotter, "Exploring the dynamic walking range of the biped robot "Run Bot" with an active upper-body component," 2006 6th IEEE-RAS International Conference on Humanoid Robots, Genova, 2006, pp. 418-424.*

M. M. Zaghloul, A. Ali-Eldin and M. Salem, "A process-centric data analytics architecture," 2014 9th International Conference on Informatics and Systems, Cairo, 2014, pp. DEKM-34-DEKM-39.*

Z. Ji et al., "Towards automated task planning for service robots using semantic knowledge representation," IEEE 10th International Conference on Industrial Informatics, Beijing, 2012, pp. 1194-1201.*

IBM Corporation, "InfoSphere Master Data Management", [online], [Retrieved on Aug. 15, 2013]. Retrieved from the Internet at <URL: http://www-03.ibm.com/software/products/en/infosphere-master-data-management>, Total 2 pp.

IP.com, "Use of a Social Media Networking & Microblogging Service for Remote Monitoring and Control of ETL Processes", Dec. 12, 2012, IPCOM000224182D, retrieved from the Internet at: URL: http://ip.com/IPCOM/000224182>, Total 4 pp.

IP.com, "Use of a Social Media Networking & Microblogging Service for Remote Monitoring and Control of ETL Processes", Dec. 12, 2012, IPCOM000224182, retrieved from the Internet at: URL: http://ip.com/IPCOM/000224182>, Total 4 pp.

Verma, A. and T. Sinha, "Embracing Social: The Next Step for Master Data Management", Cognizant 20-20 insights, Jan. 2013, Total 7 pp.

U.S. Patent Application with U.S. Appl. No. 14/499,945, filed Sep. 29, 2014, entitled, "Interactive Social Media Access to Data Systems", invented by A.J. Harden et al., Total 58 pp.

U.S. Patent Application with U.S. Appl. No. 14/686,414, filed Apr. 14, 2015, entitled, "Interactive Social Media Access to Data Systems", invented by A.J. Harden et al., Total 58 pp.

U.S. Patent Application with U.S. Appl. No. 14/499,984, filed Sep. 29, 2014, entitled, "Personalizing Data System Components and Data Sources as Chatbots in a Group Chat Session", invented by J.J. Li et al., Total 58 pp.

U.S. Patent Application with U.S. Appl. No. 14/500,020, filed Sep. 29, 2014, entitled, "Social Media Bot to Representational State Transfer (REST) Proxy for Data Systems", invented by J.J. Li et al., Total 58 pp.

U.S. Patent Application with U.S. Appl. No. 14/709,928, filed May 12, 2015, entitled, "Social Media Bot to Representational State Transfer (REST) Proxy for Data Systems", invented by J.J. Li et al., Total 58 pp.

List of IBM Patents or Patent Applications Treated as Related, Total 2 pp., May 15, 2015.

Preliminary Amendment, dated Apr. 14, 2015, for U.S. Appl. No. 14/499,945, filed Sep. 29, 2014 by A.J. Harden et al., Total 5 pp.

Preliminary Amendment, dated Apr. 14, 2015, for U.S. Appl. No. 14/686,414, filed Apr. 14, 2015 by A.J. Harden et al., Total 5 pp.

Preliminary Amendment, dated May 1, 2015, for U.S. Appl. No. 14/499,984, filed Sep. 29, 2014 by J.J. Li et al., Total 5 pp.

Preliminary Amendment, dated May 12, 2015, for U.S. Appl. No. 14/500,020, filed Sep. 29, 2014 by J.J. Li et al., Total 5 pp.

Preliminary Amendment, dated May 12, 2015, for U.S. Appl. No. 14/709,928, filed May 12, 2015 by J.J. Li et al., Total 5 pp.

Office Action 1, dated Feb. 23, 2016, for U.S. Appl. No. 14/499,984, filed Sep. 29, 2014 by J.J. Li et al., Total 30 pp.

Response to Office Action 1, dated May 17, 2016, for U.S. Appl. No. 14/499,984, filed Sep. 29, 2014 by J.J. Li et al., Total 11 pp.

Response to Office Action 1, dated Dec. 14, 2016, for U.S. Appl. No. 14/499,945, filed Sep. 29, 2014 by A.J. Harden et al., Total 8 pp.

Response to Office Action 1, dated Dec. 13, 2016, for U.S. Appl. No. 14/686,414, filed Apr. 14, 2015 by A.J. Harden et al., Total 7 pp.

Response to Office Action 1, dated Dec. 14, 2016, for U.S. Appl. No. 14/500,020, filed Sep. 29, 2014 by J.J. Li et al., Total 8 pp.

Response to Office Action 1, dated Dec. 13, 2016, for U.S. Appl. No. 14/709,928, filed May 12, 2015 by J.J. Li et al., Total 6 pp.

Office Action 1, dated Sep. 26, 2016, for U.S. Appl. No. 14/499,945, filed Sep. 29, 2014 by A.J. Harden et al., Total 35 pp.

Office Action 1, dated Sep. 13, 2016, for U.S. Appl. No. 14/686,414, filed Apr. 14, 2015 by A.J. Harden et al., Total 20 pp.

Final Office Action, dated Jul. 27, 2016, for U.S. Appl. No. 14/499,984, filed Sep. 29, 2014 by J.J. Li et al., Total 19 pp.

Response to Final Office Action, dated Oct. 26, 2016, for U.S. Appl. No. 14/499,984, filed Sep. 29, 2014 by J.J. Li et al., Total 12 pp.

Office Action 1, dated Sep. 26, 2016, for U.S. Appl. No. 14/500,020, filed Sep. 29, 2014 by J.J. Li et al., Total 38 pp.

Office Action 1, dated Sep. 13, 2016, for U.S. Appl. No. 14/709,928, filed May 12, 2015 by J.J. Li et al., Total 23 pp.

Final Office Action, dated May 11, 2017, for U.S. Appl. No. 14/499,945, filed Sep. 29, 2014 by A.J. Harden et al., Total 29 pp.

Response to Final Office Action, dated Aug. 9, 2017, for U.S. Appl. No. 14/499,945, filed Sep. 29, 2014 by A.J. Harden et al., Total 11 pp.

Final Office Action, dated May 12, 2017, for U.S. Appl. No. 14/686,414, filed Apr. 14, 2015 by A.J. Harden et al., Total 23 pp.

Response to Final Office Action, dated Aug. 9, 2017, for U.S. Appl. No. 14/686,414, filed Apr. 14, 2015 by A.J. Harden et al., Total 10 pp.

Office Action 3, dated Sep. 22, 2017, for U.S. Appl. No. 14/499,984, filed Sep. 29, 2014 by J.J. Li et al., Total 33 pp.

Response to Office Action 3, dated Oct. 13, 2017, for U.S. Appl. No. 14/499,984, filed Sep. 29, 2014 by J.J. Li et al.,Total 13 pp.

Final Office Action, dated May 12, 2017, for U.S. Appl. No. 14/500,020, filed Sep. 29, 2014 by J.J. Li et al., Total 29 pp.

Response to Final Office Action, dated Aug. 9, 2017, for U.S. Appl. No. 14/500,020, filed Sep. 29, 2014 by J.J. Li et al., Total 11 pp.

Final Office Action, dated May 9, 2017 for U.S. Appl. No. 14/709,928, May 12, 2015, 23 pp.

Response to Final Office Action, dated Aug. 9, 2017, for U.S. Appl. No. 14/709,928, May 12, 2015, 8 pp.

Office Action 3, dated Nov. 2, 2017, for U.S. Appl. No. 14/499,945, filed Sep. 29, 2014 by A.J. Harden et al., Total 27 pp.

(56) References Cited

OTHER PUBLICATIONS

Response to Office Action 3, dated Feb. 1, 2018, for U.S. Appl. No. 14/499,945, filed Sep. 29, 2014 by A.J. Harden et al., Total 11 pp.
Office Action 3, dated Nov. 3, 2017, for U.S. Appl. No. 14/686,414, filed Apr. 14, 2015 by A.J. Harden et al., Total 20 pp.
Response to Office Action 3, dated Feb. 1, 2018, for U.S. Appl. No. 14/686,414, filed Apr. 14, 2015 by A.J. Harden et al., Total 9 pp.
Final Office Action 2, dated Jan. 29, 2018, for U.S. Appl. No. 14/499,984, filed Sep. 29, 2014 by J.J. Li et al., Total 23 pp.
Response to Final Office Action 2, dated Apr. 25, 2018, for U.S. Appl. No. 14/499,984, filed Sep. 29, 2014 by J.J. Li et al., Total 15 pp.
Office Action 3, dated Dec. 27, 2017, for U.S. Appl. No. 14/500,020, filed Sep. 29, 2014 by J.J. Li et al., Total 26 pp.
Response to Office Action 3, dated Mar. 26, 2018, for U.S. Appl. No. 14/500,020, filed Sep. 29, 2014 by J.J. Li et al., Total 11 pp.
Office Action 3, dated Dec. 26, 2017, for U.S. Appl. No. 14/709,928, filed May 12, 2015 by J.J. Li et al., Total 23 pp.
Response to Office Action 3, dated Mar. 26, 2018, for U.S. Appl. No. 14/709,928, filed May 12, 2015 by J.J. Li et al., Total 10 pp.
Notice of Allowance for U.S. Appl. No. 14/499,945, pp. 29, dated Jun. 21, 2018.
Notice of Allowance for U.S. Appl. No. 14/686,414, pp. 29, dated Jun. 22, 2018.
Notice of Allowance for U.S. Appl. No. 14/499,984, pp. 16, dated Jun. 21, 2018.
Notice of Allowance for U.S. Appl. No. 14/500,020, pp. 26, dated Jul. 13, 2018.
Notice of Allowance for U.S. Appl. No. 14/709,928, pp. 23, dated Jul. 13, 2018.

* cited by examiner

Chat Session ⌐ 800

3. Chat started by User B via click of posted event #123 to ETL System "bot".
4. User B: "Show detail for message #123..
5. Chat Bot: "Issue #123: A message from user "User A" indicates that no engine credentials were found on the Services Tier for the specified user ('isadmin') on the Information Engine GINGER:31538."
6. Chat Bot: "Showing IS user isadmin"
    "Record 1:"
    "Name: isadmin"
    "OS user: none"
    "OS user password: not set"
7. Chat Bot: "Showing engine GINGER OS users"
    "admin"
    "guest"
    "Administrator"
8. User B: "Assign OS user admin to isadmin."
9. Chat Bot: "Enter password."
10. User B: "******"
11. Chat Bot: "OS user admin assigned to isadmin."
12. Chat Bot: "Should I show isadmin detail?"
13. User B: "yes"
14. Chat Bot: "Showing isadmin"
    "Record 1:"
    "Name: isadmin"
    "OS user: admin"
    "OS user password: confirmed"
15. User B: "Tell user that Issue #123 has been resolved."
16. Chat Bot: "User A, Issue #123 has been resolved. Please confirm (Yes/No)?"
17. User A: "Yes. It works now! Thanks!"
18. Chat Bot: "Issue #123 removed."

REST Calls to ETL System ⌐ 850

5. /iis/isa/<123>-GET
6. /iis/admin/users, /iis/admin/users/<isadmin>-GET
7. /iis/admin/engines/<GINGER>usersOS-GET
11. /iis/admin/users/<isadmin>-PUT (engine: GINGER, OSuser:admin, password: ******)
14. /iis/admin/users/<isadmin>-GET
19. /iis/isa/<123>-DELETE

FIG. 8

```xml
<grammars>
    <include href="usercollection.xsd"/>
    <include href="user.xsd"/>
</grammars>
<resources base="">
    <resource path="users">
        <method name="GET">
            <doc title="show user list" /> <!-- Preferred social media bot (chat) message -->
            <request>
                <param name="filter" style="query" />
                <param name="sort" style="query" />
                <param name="wadl" style="query" />
                <param name="Content-Range" style="header" />
                <param name="uuid" style="header" />
                <param name="X-API-Version" style="header" />
                <param name="X-HTTP-Error-Override" style="header" />
            </request>
            <response>
                <representation mediaType="application/json;charset=utf-8" />
                <representation mediaType="application/xml;charset=utf-8" />
                <representation mediaType="application/vnd.sun.wadl+xml;charset=utf-8" />
            </response>
        </method>
```

FIG. 9

```
<xs:element name="User">
    <xs:complexType>
        <xs:sequence>
            <xs:element name="firstName" type="xs:string" minOccurs="0" />
            <xs:element name="id" type="xs:string" minOccurs="0" />
            <xs:element name="LastName" type="xs:string" minOccurs="0" />
            <xs:element name="Location" type="xs:string" minOccurs="0" />
            <xs:element name="phone" type="xs:string" minOccurs="0" />
            <xs:element name="title" type="xs:string" minOccurs="0" />
            <xs:element name="userName" type="xs:string" minOccurs="0" />
            . . .
        </xs:sequence>
    </xs:complexType>
</xs:element>
```

| HTTP/REST METHOD | REST RESOURCE | HTTP/REST URL* | PARAM | CHAT MESSAGE | CHAT RESPONSE |
|---|---|---|---|---|---|
| GET | users | /iis/admin/users | 1. content-range - range 1-5<br>2. filter - lastname "m*"<br>3. sort - sort by lastname<br>4. uuid - wendin.bocaraton.com | get users, or show user list<br>get users n-n (e.g. 1-5)<br>get users name: <n>* (e.g. nuz*)<br>get users sort by <any> (e.g. sort by lastname) | Showing users 1-10...<br>- Record 1:<br>  - firstName: Alex<br>  - id: 12345<br>  - lastName: Nuz<br>  - location: Boca Raton FL 33487<br><br>  - userName: nuzzy<br><br>- Record 2:<br>  - firstName: Alice<br>    ... |

| HTTP/REST METHOD | REST RESOURCE | HTTP/REST URL* | PARAM | CHAT MESSAGE | CHAT RESPONSE |
|---|---|---|---|---|---|
| | 1. isa<br>2. users | 1. .../isa/<item><br>2. .../admin/users<br>3. .../admin/users/<isadmin><br>4. .../admin/engines/<GINGER>usersOS | 1. item value "123"<br>2. N/A<br>3. user value "isadmin"<br>4. engine value "GINGER" | get #123 detail | 1. Issue #123: From user "User A"<br>No Engine credentials were found on the Services Tier for the specified user ('isadmin') on the Information Engine 'GINGER:31538'<br><br>2. Showing IS user isadmin ...<br>- Record 1:<br>  - Name: isadmin<br>  - OS user: none<br>  - OS user password: not set<br>  - OS user groups: none<br><br>3. Showing engine OS users<br>- admin<br>- guest<br>- Administrator |
| PUT | users | 1. .../admin/users<isadmin> | 1. OS user value "admin"<br>2. OS password value "*******"<br>3. engine: GINGER | 1. Assign OS user admin to isadmin<br>2. Enter password | OS user admin assigned to isadmin |
| DELETE | isa | 1. .../isa/<item> | 1. item value "123" | (automatic) | 123 removed |
| ... | | 1. ... | ... | ... | ... |

* URL prefix "/iis/" for URLs not shown.

FIG. 12

PERSONALIZING DATA SYSTEM COMPONENTS AND DATA SOURCES AS CHATBOTS IN A GROUP CHAT SESSION

FIELD

Embodiments of the invention relate to personalizing data system components and data sources as chatbots in a group chat session.

BACKGROUND

Extract Transform and Load (ETL) servers may be described as ones that extract data from a source, transform the data, and load the data back to the source or to a target. Master Data Management (MDM) servers may be described as managing enterprise data and providing a Single Source of Truth (SSoT). Single Source of Truth (SSoT) may be described as structuring information models so that each data element is stored once (i.e., there are no duplicates stored), but there may be many references to the data element.

Access to ETL and MDM servers today is for the most part closed and highly specialized. ETL and MDM tool user interfaces are complex and require extensive training to use. This prevents the use of ETL and MDM servers from becoming more commonplace.

In addition, today, even a simple problem, such as duplicate records, may hold up an entire data upload process for MDM servers. Also, if multiple participants need to be contacted to solve a problem, the time to resolution can increase exponentially.

Existing ETL tools offer a Graphical User Interface (GUI) for ETL component (e.g., job) design, administration, and monitoring. The GUI for ETL component design and monitoring may be complicated, so that customers typically need to undergo training before they can use the GUI and often engage services of experts.

The ETL tool development team may struggle to keep up with ever evolving GUI technologies. Changing the GUI to these new GUI technologies may be time-consuming and expensive. Also, each time the ETL tool changes the GUI interface, customers undergo an often steep learning curve before they can use the GUI.

Developing mobile applications for the ETL tools may be difficult because of the complexity, plethora of devices to support, lack of mobile development skills, and significant time to design mobile user interfaces. As a result, the technology of the ETL GUIs may lag behind the rest of the industry.

Furthermore, the ETL tools are not leveraged as a tool to provide mobile users access to their data in their databases, data warehouses, or other data sources.

Existing MDM tools also offer a Graphical User Interface (GUI) for monitoring and administration. The GUI interface is typically a bespoke MDM interface that requires training, is accessed apart from normal business processes, and/or is embedded in other places not associated with a GUI used regularly by daily users.

SUMMARY

Provided is a method personalizing data system components and data sources as chatbots in a group chat session. The method comprises: providing, with a processor of a computer, a social media gateway interface with a chat adapter for a chat application; creating one or more chatbots that each represent a corresponding component of a data system; and using the one or more chatbots and the chatbot adapter to manage each corresponding component of the data system.

Provided is a computer program product personalizing data system components and data sources as chatbots in a group chat session. The computer program product comprises: a computer readable storage medium having program code embodied therewith, the program code executable by at least one processor to perform: providing, by the at least one processor, a social media gateway interface with a chat adapter for a chat application; creating, by the at least one processor, one or more chatbots that each represent a corresponding component of a data system; and using, by the at least one processor, the one or more chatbots and the chatbot adapter to manage each corresponding component of the data system.

Provided is a computer system personalizing data system components and data sources as chatbots in a group chat session. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations, the operations comprising: providing a social media gateway interface with a chat adapter for a chat application; creating one or more chatbots that each represent a corresponding component of a data system; and using the one or more chatbots and the chatbot adapter to manage each corresponding component of the data system.

BRIEF DESCRIPTION OF THE SEVERAL VIEWS OF THE DRAWINGS

In the drawings, like reference numbers represent corresponding parts throughout.

FIG. 8 illustrates an example chat session and example REST calls in accordance with certain embodiments.

FIG. 9 illustrates a snippet of WADL for an ETL "users" collection in accordance with certain embodiments.

FIG. 10 illustrates a collection grammar for a "users" instance "user" in "user.xsd" in accordance with certain embodiments.

FIG. 11 illustrates a table illustrating a data store entry for a resource "users" GET in accordance with certain embodiments.

FIG. 12 illustrates an example of a chat to REST mapping data store entries in accordance with certain embodiments.

DETAILED DESCRIPTION

Figure 1:
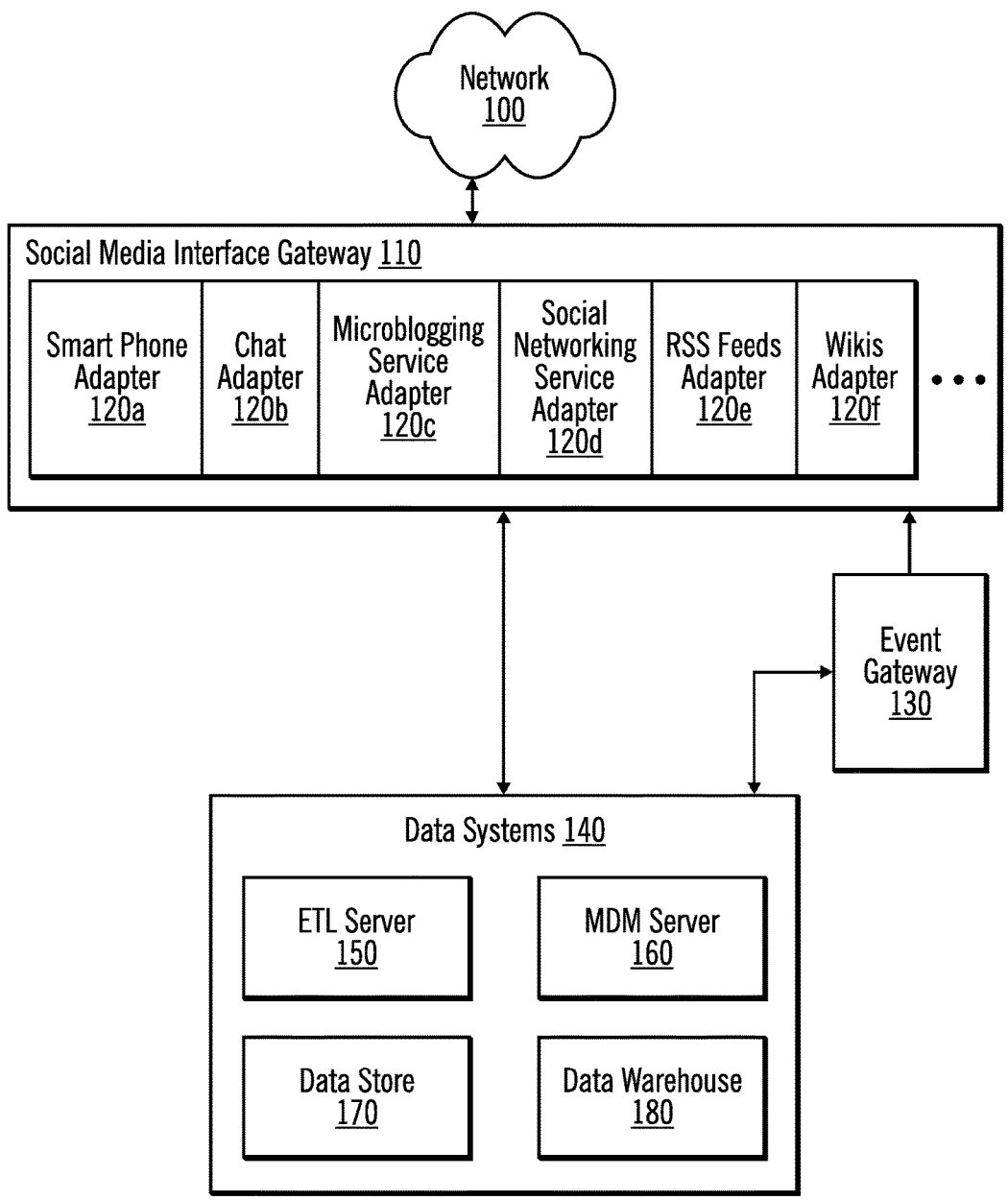
FIG. 1 illustrates, in a block diagram, a computing environment in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Interactive Social Media Access to Data Systems

Embodiments both simplify and broaden the reach of data systems, such as Extract Transform and Load (ETL) servers, Master Data Management (MDM) servers, data stores, data warehouses, etc. Embodiments create a generic social media wrapper framework for such data systems.

Although embodiments and examples herein may refer to ETL and MDM servers and components merely to enhance understanding, embodiments are applicable to other types of data systems and components (e.g., projects, jobs, stages, or administration processes).

Social media applications include, for example, a social media bot (e.g., representing a chatbot, blogs, posts, Rich Site Summary (RSS) feeds, wikis, microblogging services (e.g., that issue broadcast messages), social networking services (e.g., for data sharing), voice recognition systems, Artificial Intelligence (AI) systems, Instant Message (IM) systems, sametime systems, Short Message Service (SMS) systems, enterprise software service, self-help service, etc.

Social media concepts are about information sharing, simplicity, and personalization, and are part of the wider World Wide Web (WWW) 2.0 umbrella. Use of social media in society today is becoming more prevalent as a 24×7 means of communication with friends, family, and co-workers. In the workplace, employees work remotely, but stay connected using social media, from a variety of devices, such as smart phones.

Embodiments enable ETL and MDM servers to be accessible via social media applications, so that ETL and MDM servers may be accessed by customers when and where they need their data, using tooling they already know. Furthermore, social media applications may reap benefits from using ETL and MDM functions, such as using the ETL tools to analyze the data and provide insights or using the MDM server to provide a single source of truth. Embodiments integrate social media applications with existing ETL and MDM servers, without rewriting the ETL and MDM servers.

Embodiments provide interface mappings that allow data systems to be accessed in a social media setting via a social media interaction (message) that is converted into a request for the data system.

Embodiments map between social media interfaces such as chat messages, and Representational State Transfer (REST) interfaces to data systems, in an automated fashion, leveraging a number of REST features, including the Web Application Descriptor Language (WADL).

Embodiments enable social media access to data systems, thus broadening the reach of data system products. FIG. 1 illustrates, in a block diagram, a computing environment in accordance with certain embodiments. A social media interface gateway 110 is coupled to a network 100 and to data systems 140. The data systems 140 include an Extract Transform and Load (ETL) server 150, a Master Data Management (MDM) server 160, a data store 170, and a data warehouse 180. Also, an event gateway 130 is coupled to the social media interface gateway 110 for sending events to social media applications (e.g., via smart phone, chats, blogs, posts, RSS feeds, wikis, etc.). The events may be messages or notifications that the data systems 140 send to social media applications. With embodiments, the social media interface gateway 110 is added to an existing data system 140 to provide social media access to and from the data system 140. The social media interface gateway 110 acts as a social media wrapper for the existing data systems 140. Embodiments provide the social media interface gateway 110 and event gateway 130 to enable social media applications to interact with the existing data systems 140.

Embodiments create a way to interface between a social media application, such as a chat application, and data system components, by creating the social media interface gateway 110 (e.g., a social media robot or "social media bot" to REST proxy server). Embodiments define a social media interface gateway for social media bots at the level of the REST resource (e.g., "projects", "jobs", "users", etc.) and provide a mapping between them. Embodiments provide a generic, dynamic mechanism of generating social media messages (e.g., chat messages) to and from REST interfaces.

Embodiments apply to all social media applications, with an adapter (e.g., a "plug-in") for each different type of social media application. In certain embodiments, a social media bot is associated with an adapter. FIG. 1 illustrates some example adapters 120a, 120b, 120c, 120d, 120e, and 120f ("120a-120f"), and there may be other adapters. Note that while the social media application adapters are provided by embodiments, underneath, the layer to access the data systems 140 is shared (i.e., common). This common layer uses the external interfaces to the data systems 140 to access them, including industry standard technologies such as HyperText Transfer Protocol (HTTP) Representational State Transfer (REST).

FIG. 1 represents a base architecture of social media applications interacting with the data systems 140, with example social media application types in a pluggable architecture.

The social media interface gateway 110 contains pluggable social media components 120a-120f and provides a direct interface from the social media to the data systems 140. For example, a chatbot may be instantiated in the social media interface gateway 110 to represent the ETL server 150 or the MDM server 160. A social media timeline may indicate important events for the ETL server 150 or the MDM server 160, and notifications may be used as a way to resolve problems.

Furthermore, the data systems 140 may use multiple social media based on current or past conditions or events. For example, immediate problem resolution may warrant opening up a chat channel with a customer support representative and showing the customer support representative the issue directly so that the customer support representative may take action. A broader notification/broadcast may warrant issuing a message from the data systems 140. These social media bots access the data systems 140, using interfaces such as the industry standard HTTP REST interface, which may be self-describing with addition of Web Application Description Language (WADL). In addition to the social media bot, the social media interface gateway 110 also has the ability to analyze incoming social media (e.g., chat) messages and generate responses.

In certain embodiments, the social media interface gateway 110 uses a customizable mapping table of the social media messages (e.g., chat message) and dialect to the data systems 140. Mappings may be automatically generated from the interface itself. The social media interface gateway 110 allows social/mobile users to run/invoke/interact with the data systems 140 components via third party social media applications.

The event gateway 130 stores data system 140 events and provides the events to subscribed social media application users. The event gateway 130 may issue queries into the data systems 140 using the known interface (e.g., REST), as well as, register event endpoints with the data systems 140. In certain embodiments, the event gateway 130 also contains a message queue and may provide events for social media application adapters in the social media interface gateway 110. For example, a notification may be made to update a social media group status when an ETL component has failed or has completed.

Embodiments provide an interactive social media interface (via the social media interface gateway 110 and event gateway 130) that provides access to and from existing data systems 140. Embodiments offer more functionality than is otherwise available for the data systems 140 and enable easy access from mobile devices and other forms of access, including voice.

With embodiments, an ETL server 150, an MDM server 160, and/or other data systems 140 interactively participate in a social media setting.

Embodiments simplify ETL and MDM server usage and integrate such usage into the social media and mobile world. This enables increased reach and frequency of ETL and MDM use.

Using core characteristics of social media, embodiments enable the following social media features for the data systems 140:

Create, share, and exchange information, content, and ideas in virtual communities and networks. Embodiments create an interactive data system participant in a social media setting (e.g., a virtual person who can chat, post, etc.). For example, one could pose questions to a company's ETL server 150 or MDM server 160 via social media. Information may be conveyed via an ETL and MDM social media page, including items such as an image of a component with "map" like navigation, bringing up the stage of interest when clicked. Additional links to standard tooling may also be provided via the social media. With embodiments, the basic enablement of social media for the data systems 140 is via a new framework that adds a social media interface to the existing data systems 140. The framework is flexible and supports multiple social media adapters.

Interact: Embodiments allow social media to interact directly in a 2-way conversation, with the data systems 140 via the social media interface gateway 110.

Notify: Embodiments create the event gateway 130 that allows interested parties to receive events over social media.

Co-create/collaboration: End users of collaborative social media (e.g., group chat) may work together to create items (such as ETL components) or resolve problems (such as de-duplication of MDM upload).

Discuss: A voice gateway provides voice interactions with the data systems 140. In certain embodiments, the voice gateway is an adapter. In certain other embodiments, the voice gateway is a tool used by the other adapters.

The following is a collection of example methods that comprise the social media system for the data systems 140.

Personalizing data system components as social media bots in a smart phone group chat session. For example, this method creates a persona for an ETL or MDM component to interact with an end user in a chat session.

Social media bot to Representational State Transfer (REST) proxy for the data system 140. For example, this method automatically maps between social media and an ETL server 150 or an MDM server 160 using a social media bot-REST mapping capability.

Map a data system command line interface to a social media bot. For example, this method creates a mapping from the social media bot to an ETL command line utility and an MDM command line utility.

Voice gateway interface to data systems 140. For example, this method uses voice as one of the social media gateways, thus, enabling a voice to ETL and MDM capability.

Voice print biometrics to access the data systems 140. For example, this method is for identification, personalization, and security for a voice to ETL and MDM path.

Natural Language Understanding (NLU) for use in social media with the data systems 140. For example, this method uses natural language for the interactions with the ETL server 150 and the MDM server 160 for more conversational social media, such as chat or voice.

Tracking usage of the data systems 140 via social media. For example, this method tracks usage of the ETL server 150 and the MDM server 160 via social media. This method may be used for basic feature usage statistics or problem determination.

Social media usage analysis for data systems 140. For example, this method provides usage analysis for ETL and MDM interactions to predict patterns and make recommendations of actions for the end user. Access to history of usage may be used to improve the actions and responses of social media bots.

Social media dialect (e.g., chat) for the data systems 140. For example, this method creates a dialect/language for social media (e.g., chat) that is ETL and MDM specific.

Social media detection and modality switch during a data system interaction. For example, this method provides an ability to detect and switch social modality in a multi-modality environment, based on conditions, such as type or amount of information to convey to end user, or urgency of information.

Embodiments provide a complete social media system. Use of social media for the data systems 140 now enables communication with the data systems 140.

Merely to enhance understanding of embodiments, some examples are provided herein. For example, a process to remove duplicates from MDM data may be integrated across a variety of social media. In this way, the appropriate media is chosen to best solve each interaction. The MDM server 160 is given a "voice" in this process, as the MDM server 160, via a social media bot interface, and may interact in this social media setting as if it were a person. This interaction may include interfacing with other social media as well as actual people. Furthermore, this technique enables multiple people to help resolve an issue as needed. Use of social media in this way reduces the time to resolve issues and improves the overall communication between the MDM server 160 and users.

Figure 2:
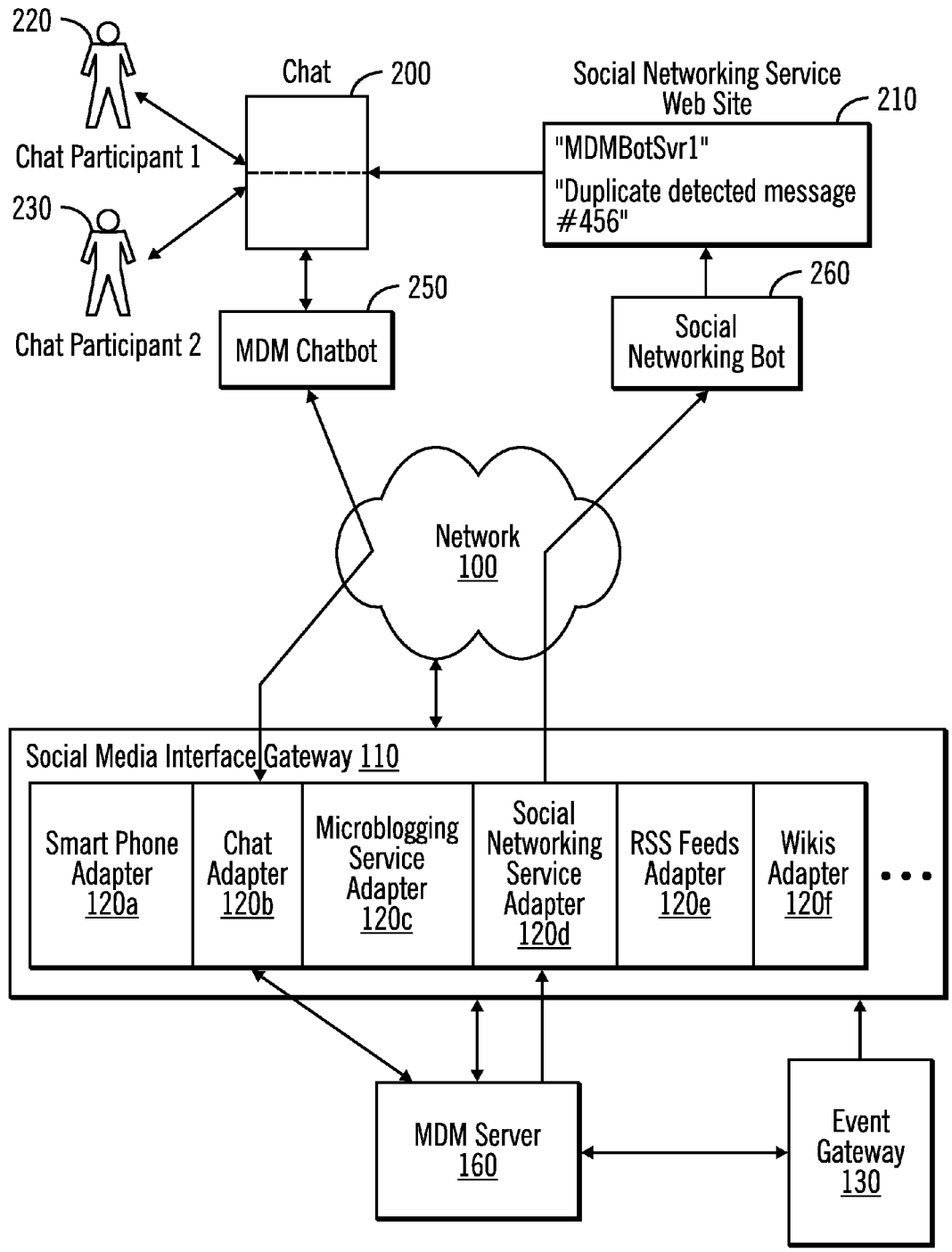
FIG. 2 illustrates an example for duplicate record resolution in accordance with certain embodiments.

FIG. 2 illustrates an example for duplicate record resolution in accordance with certain embodiments. In FIG. 2, the following path is used: using an MDM server 160→social networking service adapter 120*d*→social networking bot 260→social networking service web site 210 path. In FIG. 2, the MDM server 160 has detected duplicate records while processing and the following processing occurs:

1. The MDM server 160, through social networking service 120*d*, uses a social networking bot 260 to post an event "Duplicate detected message #456" to the social networking web site 210.

2. An MDM administrator, "User" 220 (chat participant 1), sees this message and clicks on the message link. In response to the click on the link, a chat session 200 is created. An MDM chatbot 250 is created to participate in the chat session 200 on behalf of the MDM server 160 (the originator of the event). The MDM server 160 may be described as a regular chat user on the User 220 chat application. The User 220 may invite the MDM server 160 to start a chat, which creates the MDM chatbot 250. A chatbot may be described as a chat robot. The MDM chatbot 250 will communicate to MDM server 160 through the chat adapter 120*b*. In particular, the chat messages go from chat session 200←→MDM chatbot 250←→chat adapter 120*b*←→MDM server 160. That is, the chat messages are bi-directional. Likewise, the messages between user 220 and chat session 200 are bi-directional. In this example, the chat session 200 between the "User" 220 and the MDM chatbot 250 follows and quotes are used to identify chat messages:

3. User 220: "For duplicate detected message #456, show items.

4. MDM chatbot 250:
">John Doe 111 Main"
">John Doe 111 Main, Austin, Tex. 78758"

5. The User 220 invites a peer, chat participant 2 230, to a group chat, along with the MDM chatbot 250. Chat participant 2 230 joins the chat session 200.

6. User 220: "Chat participant 2 230, can you confirm and accept record 2?"

7. Chat participant 2 230: "Sure"

8. User 220: "Show duplicate record detail"

9. MDM chatbot 250:
"Record 1:"
"Name: John Doe"
"Address: 111 Main"
"City: Austin"
"Record 2:"
"Name: John Doe"
"Address: 111 Main"
"State: TX"
"Zip: 78758"

10. Chat participant 2 230: "Accept City from Record 1; Accept State and Zip from Record 2"

Figure 3:
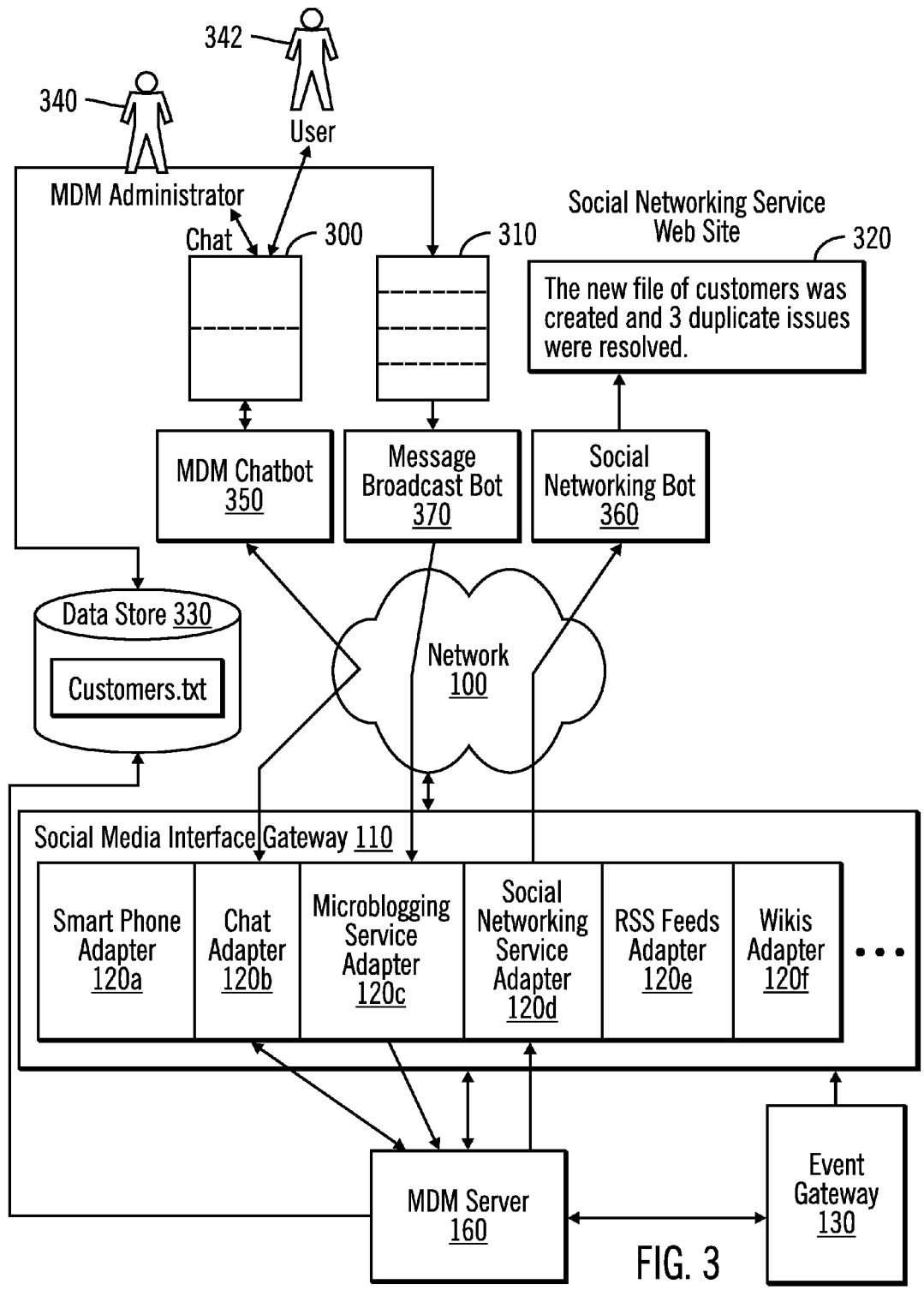
FIG. 3 illustrates another example for duplicate record resolution in accordance with certain embodiments.

FIG. 3 illustrates another example for duplicate record resolution in accordance with certain embodiments. In FIG. 3, the following path is used: a broadcast message 310→the message broadcast bot 370→microblogging service adapter 120*c*→MDM server 160.

In FIG. 3, the following processing occurs and quotes are used to identify chat messages:

1. An MDM administrator 340 places a new file into an upload/scratch data store 330 on a server. A user 342 may also participate in the chat session 300. For example, the user 342 may be invited at step (9) below to resolve issues.

2. The MDM administrator 340 posts a broadcast message 310 via a microblogging service, for "New file of customers ready for upload", along with instructions including "Analyze upload file for duplicates" and filename "customers.txt". The message broadcast bot 370 receives the broadcast message (which may be part of or work with the chat adapter 120*b*) and forwards the broadcast message 310 to the microblogging service adapter 120*c*. In certain embodiments, this will be completed using an application for the MDM administrator 340. The MDM administrator 340 opens the application and selects the MDM server 160, which is shown as an application to the user. The message broadcast bot 370 is created by the application to broadcast messages to the MDM server 160 through the microblogging service adapter 120*c*. The microblogging service adapter 120*c* forwards the broadcast message 310 to subscribers (who subscribe to the microblogging service).

3. The MDM server 160 is a subscriber and gets this broadcast message 310.

4. The MDM server 160 starts the analysis on file "customers.txt".

5. The MDM server 160 detects an issue, and, finding the MDM administrator 340 online, starts a chat session 300 with the MDM administrator 340 through the chat adapter 120*b* and MDM chatbot 350. The chat messages go between: the MDM server 160←→chat adapter 120*b*←→MDM chatbot 350←→chat session 300.

6. MDM chatbot 350: "The customers.txt file has 14 new records and 3 duplicate records"

7. MDM administrator 340: "Show the 3 duplicate records"

8. MDM chatbot 350: "Joe Smith, Joseph Smith, Joey Smith"

9. MDM administrator 340: "Resolve duplicates in the source file"

10. MDM administrator 340: "MDM chatbot 350, load the source file"

11. MDM chatbot 350 sends a message to the MDM sever 160 through the chat adapter 120*b*, and the MDM server 160 loads the file without error.

12. The MDM server 160 sends a message to the social networking service adapter 120*d* to update the status. The messages goes from: MDM server 160→social networking service adapter 120*d*→social networking bot 360→social networking service web site 320. In this example, the MDM s social networking bot 360 posts, to the social networking web site 320 timeline, a message that the new file of customers was created and that 3 duplicate issues were resolved.

In the following example, there is a path from Customer call→Chat→Social Networking Service. In this example, a "User" gets a call about customer B. Turner, and wishes to add him as a friend to his personal data sharing web site page, but the User needs to obtain more detailed contact information for B. Turner first. The User uses the social media gateway 110 to ask the MDM server 160 to look up the customer record for B. Turner. The MDM record indicates that B. Turner is a preferred customer. So, via the MDM chatbot, the User adds B. Turner to his data sharing web site page as a preferred customer.

1. User starts up a chat session to the MDM server 160.
2. User: "Show me B. Turner."
3. MDM chatbot:
"Record 1:"
"Preferred Customer: YES"
"Name: B. Turner"
"Address: 111 Main"
"City: Austin"
4. User: "Add B. Turner to my data sharing web site."
5. The MDM data sharing bot adds B. Turner to User's data sharing web site. Because B. Turner is a preferred customer, he is added to the User's "Preferred Customer" list.

Figure 4:
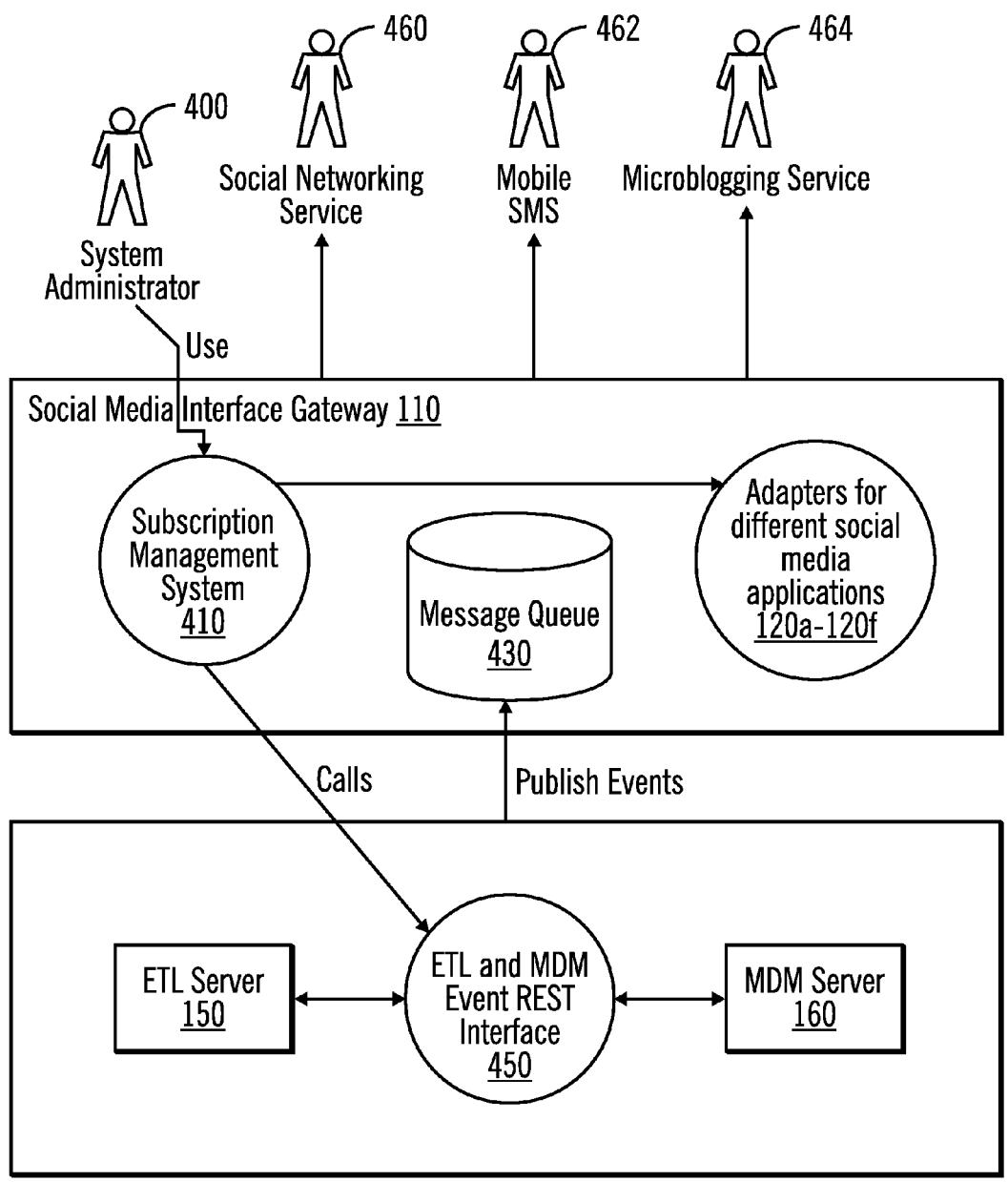
FIG. 4 illustrates an example of how a social media interface gateway manages the ETL and MDM events in accordance with certain embodiments.

FIG. 4 illustrates an example of how the social media interface gateway 110 manages the ETL and MDM events in accordance with certain embodiments. First, the system administrator 400 uses a subscription management system 410 to register events that are to be subscribed from the ETL server 150 and the MDM server 160 and which users can access what ETL and MDM events on which social media applications. Second, the ETL and MDM event REST interface 450 allows the social media interface gateway 110 to register what events need to be published from the ETL server 150 and MDM server 160 Third, the ETL server 150 and the MDM server 160 publish the subscribed events to the message queue 430 managed by the social media interface gateway 110. Fourth, the social media interface gateway 110 dispatches the received events to various social media applications for different users 460, 462, 464 based on the subscription information via adapters 120a-120f. In certain embodiments, there is one adapter implemented for one social media application in the social media interface gateway 110 to handle how to connect to the social media application and how to send events to the social media application.

Figure 5:
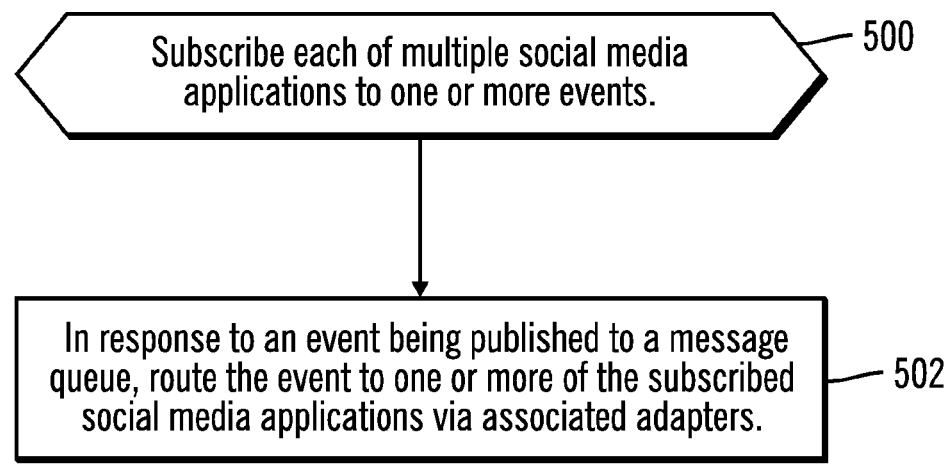
FIG. 5 illustrates, in a flow diagram, operations for event processing in accordance with certain embodiments.

FIG. 5 illustrates, in a flow diagram, operations for event processing in accordance with certain embodiments. Control begins at block 500 with each of multiple social media applications subscribing to one or more events. In block 502, in response to an event being published to a message queue, the event is routed to the subscribed social media applications via an adapter.

Figure 6:
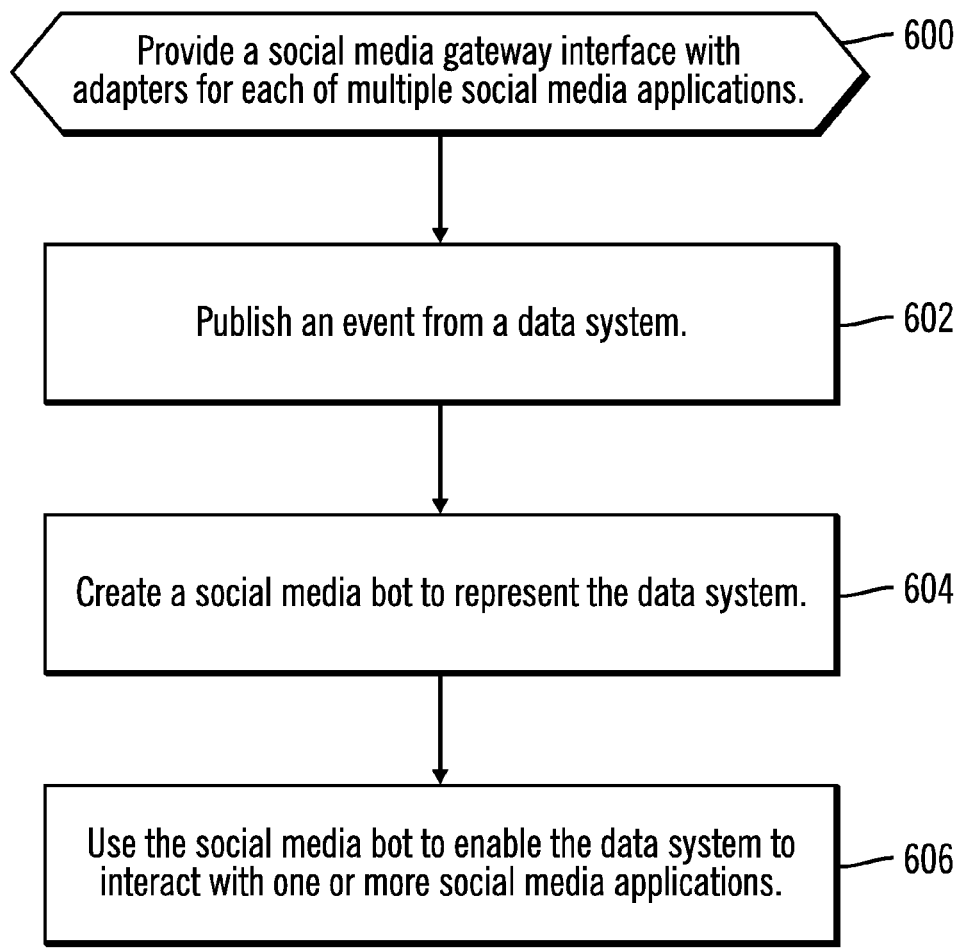
FIG. 6 illustrates, in a flow diagram, operations for interactions with social media applications in accordance with certain embodiments.

FIG. 6 illustrates, in a flow diagram, operations for interactions with social media applications in accordance with certain embodiments. Control begins at block 600 with a social media gateway interface with adapters for each of multiple social media applications being provided. In block 602, an event is published from a data system (e.g., an ETL server, an MDM server, a data store, a data warehouse, etc.). In block 604, a social media bot is created to represent the data system. In block 606, the social media bot is used to enable the data system to interact with one or more social media applications.

Embodiments provide a generic, broad, social media wrapper/framework for the existing data systems 140. For example, embodiments provide a way to interactively participate with social media applications, personify ETL and MDM components, tasks, and data sources as social media bots, allow interaction between bots and other social media participant end users, as well as, switch social media types based on the interactions.

Embodiments bring social media and data systems 140 together. Embodiments, use industry standard techniques for this integration.

Embodiments raise data system 140 into a new dimension of use. Embodiments make the data systems 140 easier to use and access and make it easy for social media users to integrate data systems 140 into their applications.

Embodiments deal with a broad set of social media applications, such as, chat, blogs, posts, RSS feeds, wikis, enterprise software, etc. To support various social media, embodiments define common layers, interfaces, and frameworks to deal with mapping ETL engine Application Programming Interfaces (APIs)/Components to messages, chats, voice, etc.

For example, embodiments monitor and control the ETL component runs. Embodiments also allow users to create, design, and modify various ETL components. Furthermore, with embodiments, ETL and/or MDM servers become interactive social media participants.

Embodiments also set up an event gateway 130 (e.g., an event monitoring system) based on a subscription model to deal with securities and delivering messages to different social media applications. Embodiments provide an event gateway 130 to control how each data system component sends events at real time to the event monitoring system rather than polling operational databases.

Embodiments create a bi-directional social media interface gateway 110 on top of the existing data systems 140, so that the data systems 140 may interact directly with social media systems, via, for example, use of social media bots.

Embodiments use a social media platform to aid in a number of processes in the data system landscape, by allowing an interactive interface that provides access to and from the existing data systems 140.

For example, embodiments virtualize the ETL server 150 and the MDM server 160 as a virtual person to participate in social media. Embodiments use one or multiple social media as an interface to interact and collaborative with real persons to resolve tasks in the ETL server 150 and the MDM server 160. Embodiments introduce the use of a social media interface gateway 110 with a dedicated adapter for each specific social media that will integrate social media and the ETL server 150 and the MDM server 160. Embodiments provide the ETL server 150 and the MDM server 160 a dialect to speak in social media. Embodiments provide subscribe management for ETL and MDM events. Embodiments selectively use the best social media to conduct an ETL or MDM task. Embodiments use social media for ETL and MDM server usage tracking and analysis.

Embodiments provide a pluggable social media component for accessing an Application Programming Interface (API) by providing an interface supporting pluggable social media components to access an API. The pluggable social media components include, for example, a social media bot, a voice recognition system, an artificial intelligence (AI), an instant message (IM), a sametime, a short message service (SMS), a social web, chat, blog, service, self-help service, rich site summary (RSS) feeds, etc. In certain embodiments, the API supports services selected from a group consisting of ETL services, subscribe services, register services, tracking services, analysis services, MDM services, etc. In certain embodiments, the interface utilizes a first message queue for interacting with social media components and a second message queue for the API.

Social Media Bot to Representational State Transfer (REST) Proxy for Data Systems Merely to enhance understanding, examples may be provided herein with reference to ETL components, however, embodiments also apply to other data system components and to data system data sources.

Embodiments provide a "social media bot" to "REST" proxy service with the social media interface gateway 110. With embodiments, a system administrator selects which data system components (e.g., which ETL/MDM components) to expose via existing REST resources. Interfaces to the social media bots (e.g., chat messages) are generated from these REST resources. Use of the WADL description for REST services enables the automation of this process. WADL is a feature automatically provided for REST resources. In certain embodiments WADL is written using the Java® API for REST resources (JAX-RS). (Java is a registered trademark of Oracle Corporation in the United States and/or other countries.) Via the generated social media bot messages, end users invoke the data system functions from social media applications.

For example, chatbots participate in mobile chat sessions as virtual chat participants accepting input from chat participants (e.g., human users). To perform data system functions, a chatbot uses the data system REST services and presents the results from the REST calls as chat messages back to the chat participants.

Embodiments use social media to select and invoke existing data system components via REST services. The social media application may be an existing mobile chat application. With embodiments, social applications allow multiple users to participate in a group chat session to work with existing data system components (via REST resources) interactively and collaboratively using plain instructions, commands, or voice.

Embodiments present a new way of invoking data system components from social media and mobile platforms using a new social media bot-REST proxy. This REST proxy converts the input expected by REST into social media messages posed as questions to end users (e.g., chat questions). Information in the end user responses is used to issue the REST calls to the data system components in the data system server. In turn, the social media bot-REST proxy converts the output from the REST calls into messages for display in social media applications.

With embodiments, social media bots are automatically generated from REST resources defined by WADL, rather than hand coded. This saves time and effort to expose data system components to social media applications.

With embodiments, there is no need to change existing data systems or their REST services to run within social media applications.

With embodiments, a mapping table of social media messages to REST calls is created and may be updated at any time without affecting the overall system operation. The mapping table may be customized further by user provided message processing.

In certain embodiments, end users may interact with data system components via a mapping layer to their REST interfaces, using a social media application. An example of such an application may be a group chat application that runs on a smart phone. Under the covers, these chat messages are mapped to REST calls and vice versa.

Embodiments may return the description of the REST resource in WADL. This description may be obtained "live" via a run-time request or it may be static. With embodiments, the description defines the operations that may be performed on the resource, as well as, the expected inputs and outputs. This discovery may be performed by a system administrator or via done automatically with tooling.

Using the WADL, the REST resources are registered in a social media bot registry and a user access control data store as data system components for use by the social media interface gateway 110.

A system administrator may also set up the access privileges to specify who can invoke the data system components and what users may do with each REST API. This may be done using a web application, a stand-alone tool, or a mobile application.

For example, a chat middleware participates in the social media application as a "bot" representing an instance of a data system component. The data system component is assigned a name based on the REST resource name and instance, along with any configured naming conventions.

End users may invite these registered bots to a social media application (e.g., a group chat session) using the chat middleware.

When an end user sends a social media message (e.g., chat message) to a social media bot, with embodiments, a chat message mapper converts the social media message to a REST call using a mapping data store.

The mapping to REST mapping data store may be further customized by users (e.g., a system administrator) to improve the social media bot messages. Additionally, a callout may be utilized to external components with enhanced grammar matching capabilities to further improve the social message matching and generation capabilities. For interactive social media, such as chat, this provides a more natural/conversational dialog for the chat messages. For example, instead of the chat message "get users" one could say "can I have a list of users" or "what users are there".

When the social media bot wishes to send a social media message (e.g., chat message) back to the other chat participants, the social media bot uses the message to REST mapping data store to convert the REST response back to another social media message (e.g., a chat message).

For example, a common problem is that a system administrator forgets to set credentials for an ETL or MDM server. The problem appears in the following manner. UserA tries to access the ETL or MDM server and reports that she used "GINGER" as the host name of a services tier and the user/password "isadmin" and received the error: "No credentials were found on the Services Tier for the specified user ('isadmin') for 'GINGER:31538". For this example, the system administrator was in a different time zone, and had gone home for the day. In such cases, USERA may spend a great deal of time trying to resolve the problem and may have to wait until the next day to find out that a simple credential mapping had not been performed. With embodiments, a system administrator may be notified via social media of this urgent event. Using a mobile phone, the system administrator may click on the received message link to invoke a mobile group chat session to a bot on the ETL server to set the right credentials.

Figure 7:
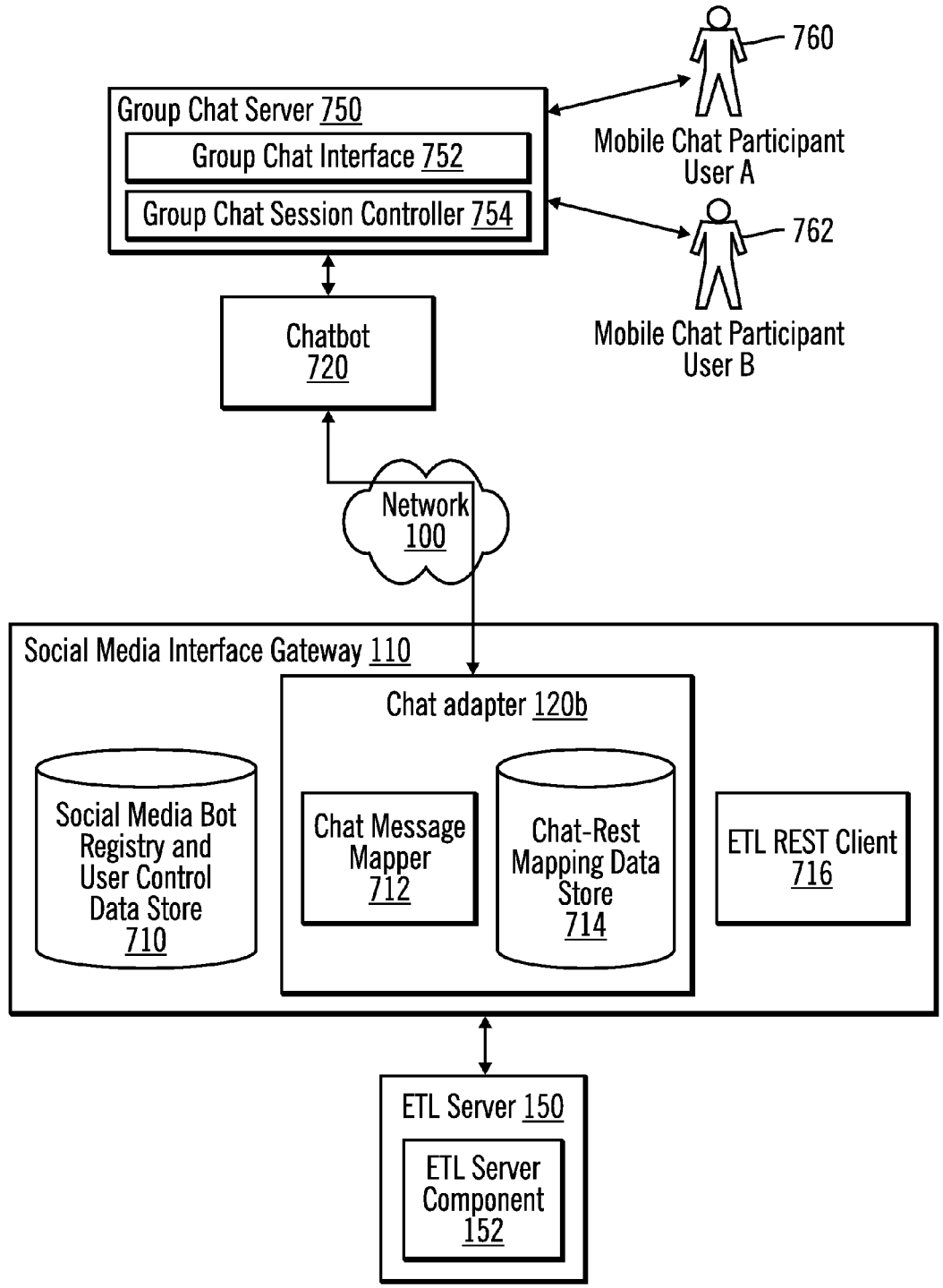
FIG. 7 illustrates use of a social media bot to resolve a problem in accordance with certain embodiments.
Figure 13:
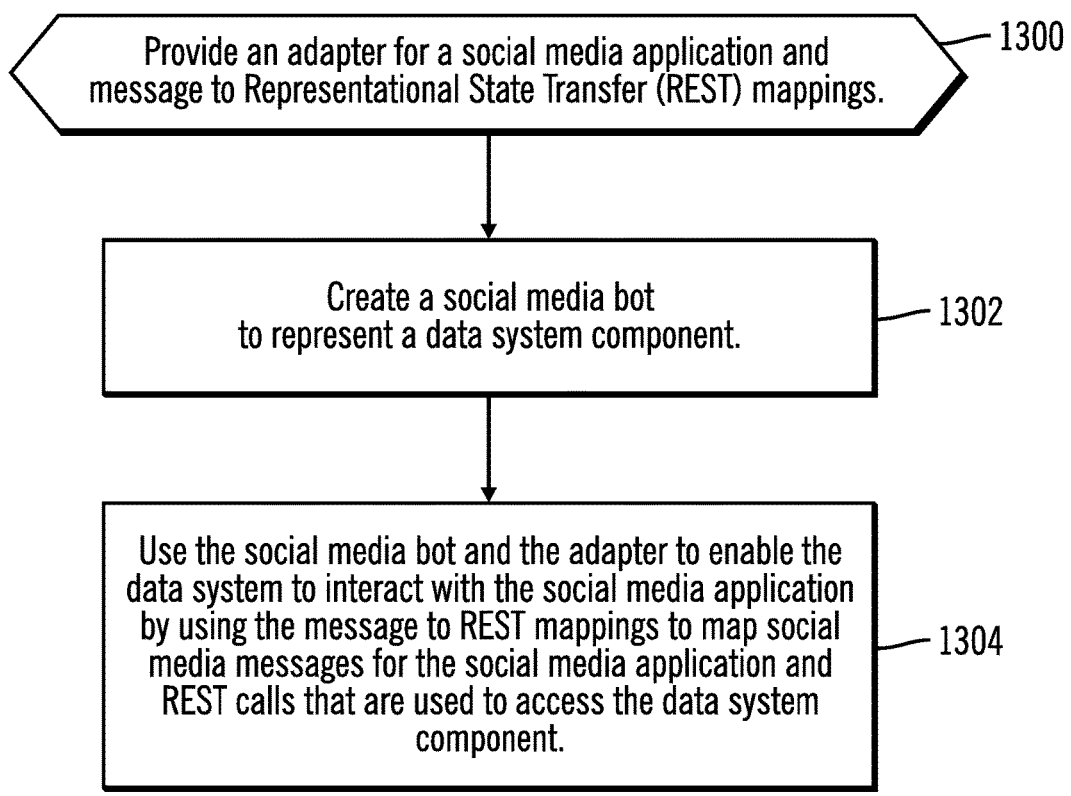
FIG. 13 illustrates, in a flow diagram, operations for using message to REST mappings in accordance with certain embodiments.

FIG. 7 illustrates components to implement an ETL group chat session in accordance with certain embodiments. Similar components may be used to implement an MDM group chat session in other embodiments. Also, although the illustration of FIG. 7 describes a chatbot, other embodiments are applicable to other types of social media bots (for each type of adapter).

A group chat server 750 is responsible for managing on-going group chat sessions and dealing with various concurrent access issues to the group chat session. The group chat server 750 includes a group chat interface 752 and a group chat session controller 754.

A social media interface gateway 110 includes a chat adapter 120b, a social media bot registry and user access control data store 710, and an ETL-REST client 716. In certain embodiments, a chat adapter 120b (e.g., an ETL group chat adapter) for a chat application is the mediating component between the group chat server 750 and the ETL server 150. The chat adapter 120b includes a chat message mapper 712 and a chat-REST mapping data store 714. Also, there is a chatbot 720 for interactions between the chat adapter 120 and the group chat server 750. The ETL server 150 includes an ETL server component 152. The chat-rest mapping data store 714 store message to REST mappings for use in converting between REST calls and social media messages.

In the example of FIG. 7, there are two human chat participants, chat participant A 760 and chat participant B 762.

FIG. 8 illustrates an example chat session 800 and example REST calls 850 in accordance with certain embodiments.

With reference to FIGS. 7 and 8, the following example is provided. Initially, user A attempts to set up an ETL project. She can access the ETL host 'GINGER', but is unable to set up her project and does not know why. She sees an error message, but it is not clear what is wrong. An ETL component 152, via a social media bot for the microblogging service adapter 120c, posts an event to the ETL server 150 on behalf of user A's failed attempt. The message is: "No Engine Credentials Found on the Services Tier #123".

For this example, an ETL administrator user "User B" has gone home for the day, but is notified via the message of this urgent event. Using a mobile phone, User B clicks on the #123 message link. This invokes a mobile group chat session to the chat bot 720 on the ETL server 150 (the originator of the event). The chat bot 720 is sent this message, and a chat session between chat participant User B 762 and the chat bot 720 follows and quotes are used to identify chat messages:

User B: "Show detail for message #123"
Chat Bot: "Issue #123: A message from user "User A" indicates that no engine credentials were found on the Services Tier for the specified user ('isadmin') on the Information Engine GINGER:31538."

Using a problem determination symptom analysis data store, the chat bot 720 finds that problem 123 means an Operating System (OS) user needs to be assigned to the specified Information Services (IS) server user. The chat bot 720 shows chat participant User B 762 the details for the IS server user "isadmin" followed by the information for the engine's operating system users on host GINGER and quotes are used to identify chat messages.
Chat Bot: "Showing IS user isadmin"
  "Record 1:"
  "Name: isadmin"
  "OS user: none"
  "OS user password: not set""
Chat Bot: "Showing engine GINGER OS users"
  "admin"
  "guest"
  "Administrator"
User B: "Assign OS user admin to isadmin.
Chat Bot: "Enter password."
User B: "******"
Chat Bot: "OS user admin assigned to isadmin."

Chat Bot: "Should I show isadmin detail?"
User B: "yes"
Chat Bot: "Showing isadmin"
  "Record 1:"
  "Name: isadmin"
  "OS user: admin"
  "OS user password: confirmed"
User B: "Tell user that Issue #123 has been resolved."

The chat bot 720 looks up user "User A" and locates a chat address. The chat bot 720 invites User A to the chat session.
Chat Bot: "User A, Issue #123 has been resolved. Please confirm (Yes/No)?"
User A: "Yes. It works now! Thanks!"
Chat Bot: "Issue #123 removed."

In certain embodiments, the group chat server 750 is responsible for managing the on-going chat sessions. The group chat server 750 also manages concurrent access from multiple chat users in a chat session.

In certain embodiments, the social media interface gateway 110, which includes the chat adapter 120b, is a gateway between the group chat server 750 and data systems, such as the ETL server 150. The chat adapter 120b allows social media users to invoke the ETL component 152 on the ETL server 150, via a REST proxy, for social media applications (e.g., a chat application).

The social media bot registry and user access control data store 710 is a repository for registering REST resources to be exposed to the social media applications as "social media bots". The social media bot registry and user access control data store 710 also contains user registrations and access privileges of each user to each registered REST resource.

The REST resource details are mapped into social media messages and placed into the chat-REST mapping data store 714.

When REST resources are registered on the data system (e.g., ETL server 150), the REST resources are analyzed using the site's WADL schema. FIG. 9 illustrates a snippet of WADL 900 for an ETL "users" collection in accordance with certain embodiments. This WADL 900 represents the decomposed resource, media types, items, and defined actions/verbs. From the WADL 900, there is a resource named "users" with an HTTP method "GET". There are optional parameters of: "filter", "sort", "wadl", "content-range", and "uuid". So this REST resource "users" with method "get" may translate to a chat message of "get users". Also an alternative, more user friendly/conversational message of "show user list" may be provided.

Furthermore, from the WADL 900, the resource grammars and/or media type information for the request input/output may be used. FIG. 10 illustrates a collection grammar 1000 for a "users" instance "user" in "user.xsd" in accordance with certain embodiments. In certain embodiments, this is the item record schema for the user collection.

FIG. 11 illustrates a table 1100 illustrating a data store entry for a resource "users" GET in accordance with certain embodiments. Extensible Markup Language (XML) has an XML Schema Definition (XSD). In FIG. 11, the data store entry is based on using the WADL 900 and item XSD illustrated in FIG. 10.

Additionally, the chat-REST mapping data store 714 may contain the following features.

a) A single chat interaction may require multiple REST calls.

b) The chat-REST mapping data store 714 may be further customized by users anytime, even at runtime, without affecting the operational characteristics of the overall system.

c) For interactive social media, a more conversational set of messages may be desired. For such cases, an external entity, such as a Natural Language Understanding (NLU) system may be used to create a more conversational/user-friendly set of messages.

FIG. 12 illustrates an example of a chat to REST mapping data store entries 1200 in accordance with certain embodiments.

In certain embodiments, an end user may invite a registered ETL component chatbot to join a group chat session via the chatbot 720. The group chat server 750 sends chat updates, notifications, and invitations to participants to a chat session, such as the chatbot 720. To send messages, voices, images, etc. to a group chat session, chat participants use the group chat interface 752 exposed by the group chat server 750.

Multiple concurrent chatbot instances may exist, and each chatbot may represent a different REST resource instance.

The end user sends conversational chat messages to the chatbot for the ETL component 152. The chatbot uses the chat message mapper 712 to map chat messages into REST calls. The mapper uses the chat-REST mapping data store 714 to do this conversion. The chatbot then uses the ETL REST client 716 to invoke the ETL component 152 on the ETL server 150. The same process may be used when the end user responds to a chat prompt.

Likewise, the chatbot 720 uses the REST client to receive a response/results from the ETL component 152. The chatbot 720 provides the REST response to the chat message mapper 712 for conversion into a conversational chat message. The conversational messages are sent to the mobile chat session via the group chat 752 and group chat server 750.

Embodiments automate services based on representational state transfer (REST) interfaces by providing a social media bot registry and user access control data store 710 for REST resources; providing a social media interface gateway 110 allowing a user to access the REST resources based on entered text; responsive to a user utilizing the social media interface gateway 110 and entering text, utilizing natural language processing (NLP) to analyze the text for a REST resource in the social media bot registry and user access control data store 710; and, responsive to identifying the REST resource, automatically accessing the REST resource based on the analyzed text.

In certain embodiments, the social media interface gateway 110 is supported on a social media selected from a group consisting of an instant message (IM), a sametime, a short message service (SMS), a social web site, chat, blog, service, self-help service, chat, blog, rich site summary (RSS) feeds, and etc.

In certain embodiments, the REST resource is for a service selected from a group consisting of ETL, subscribe, register, tracking, analysis, MDM, etc.

Personalizing Data System Components and Data Sources as
Chatbots in a Group Chat Session Embodiments allow customers to use their existing social applications, which they are familiar with, to access data system tools. In particular, customers may now inspect, create, modify, administer, and monitor the data system components using mobile applications, such as on smart phones.

Mobile applications and social applications (e.g., on smart phones) are becoming more popular. One such popular application is a group chat application. Embodiments leverage existing mobile applications and social applications, such as the group chat application, that customers already know how to use, with data system tools.

Embodiments implement a solution for chat in the framework for data systems 140. Embodiments create a collection of interactive group chat participants, also known as "chatbots", that each represents a different data system component/data source. Furthermore, embodiments determine how they work together and how they collaborate with end-user chat participants to solve problems.

Embodiments extend existing mobile group chat applications. Embodiments enable data system component design, update, create, run, control, and otherwise administer data system components and access data in a collaborative way. Embodiments create and personify various data system components and data sources as virtual chat participants in a group chat session, where different data system components and data sources are represented dynamically as different chatbots. In this manner, ETL components and MDM components, for example, become interactive chat participants.

Embodiments enable creating, modifying, inspecting, administering, and monitoring a data system component using a group chat application. The data system components (e.g., projects, jobs, stages, or administration processes) are personified as chat robots, or chatbots. The data system components represented by the chatbots evolve during the group chat sessions based on the messages posted by customers (end users). The chatbots representing the data system components may show images that represent the data system component (such as overall ETL stage flow diagrams), report the status of the data system job (such as job run status, error codes, and error messages), provide links to web pages, and invite another person (e.g., a customer support agent) to join a chat session (e.g., if a problem arises).

Furthermore, embodiments personify data sources directly as chatbots so that users may access to their data directly from their mobile chat applications. For example, the ETL/MDM tool is leveraged at the back-end to run the data extraction or to run MDM jobs created in real time based on user's inputs from mobile chat applications.

With embodiments, the data system GUI applications and solutions:

1. Use a mobile group chat to design and monitor data system job designs. The mobile group chat may be an existing group chat application with a virtual chat participation interface.

2. Personify data system components and data sources as group chat participants. The group chat allows multiple users to participate in the group session to work with their data or various data system components in an interactive and collaborative way using plain instructions, commands, or voice.

3. Provide mobile users 24×7 access to their data in their data sources and various features in the data systems.

4. Leverage features of existing chat applications to invite customer support agents to a chat session for problem determination, should the condition warrant. The customer support agents are provided the chat history and information to help resolve the problem.

Merely to enhance understanding, examples will be provided herein with reference to ETL components, however, embodiments also apply to other data system components.

In one embodiment, when a customer wants to create, modify, inspect, run, or monitor an ETL job on an ETL server from a smart phone, the customer starts a mobile chat application and invites the ETL server chatbot to the chat session. Through the chat session, customers may create, inspect, modify, administer, and/or monitor ETL components (e.g., projects and jobs). Each of the ETL components: ETL server, project, jobs, administration, and stages joins the chat session as a different chatbot. Thus, if there are 5 ETL components, there may be 5 chatbots (one for each of the components).

In another embodiment, when a customer wants to access and discuss data, such as sales leads, from smart phones, the customer starts a mobile chat application and invites the ETL server chatbot to the chat session. The ETL server presents a list of data connections that it can access. For this example, the customer selects a customer system and asks for the sales leads in the customer system. At the back-end, based on the customer's requirement, a data extraction job is created in real-time to extract the data from the lead object in the customer system. The extraction result is presented to the customers as chat messages.

The following shows an example of how an ETL job may be created in a group chat session:

1. A customer starts a group chat application on a smart phone.
2. The customer invites the ETL server chatbot "ETLSrv1" to a group chat session. The "ETLSrv1" may be listed as a virtual user contact in the user's contact list.
3. The customer types the chat message "ETLSrv1, open project "Emp" into the chat application, and the chatbot "ETLSrv1" invites the chatbot "ETLProjEmp" to join the chat. The chatbot "ETLProjEmp" represents the ETL project "Emp".
4. The customer types the chate message "ETLProjEmp, create an ETL job EmpUpdt". The chatbot "ETLProjEmp" creates a new ETL job "EmpUpdt" and invites a chatbot "ETLJobEmpUpdt" to join the group chat session.
5. The customer types the chat message "ETLSrv1, show all supported stages". The chatbot "ETLSrv1" lists all the stages supported by server: "Extensible Markup Language (XML), transformer, Sequential File, etc. with images."
6. The customer types the chat message: "ETLJobEmpUpdt, add a sequential File stage input". The chatbot "ETLJobEmpUpdt" adds the sequential file stage "input" to the ETL job and invites a new participant chatbot "input step" to the session.
7. Similarly to the processing of step 6, the customer adds another operation of "transformation operation", "output operation", to the ETL job. As each operation is added, an additional group chat participant (chatbot) that represents the operation is added.
8. The customer may use the same chat session to set up the stage properties in similar fashion.
9. Finally, the customer types the chat message "ETLJobEmpUpdt, run" and the ETL job runs to complete, and the chatbot "JobEmpUpdt" shows the running results or failure messages in a chat session (e.g., in a chat window in which the participants are chatting).

The following is an example of how to use a data source chatbot to retrieve sales leads from the customer system in a mobile chat session:

1. A customer starts a group chat application on a smart phone.
2. The customer invites the ETL server chatbot "ETLSrv1" to a group chat session. The "ETLSrv1" may be listed as a virtual user contact in the user's contact list.
3. The customer types the chat message "ETLSrv1, show all the data sources" into the chat application, and the chatbot "ETLSrv1" shows all the data sources supported by an ETL server in the chat session and asks "which data source you want to access?". For example, the data sources may be shared data connections created by various ETL connectors.
4. The customer types the chat message "ETLSrv1, access Customer System". The chatbot "ETLSrv1" invites a chatbot "Customer System" to join the chat session. The chatbot "Customer System" shows a list of supported data objects or queries and asks "which data do you want to know?"
5. The customer types the chat message "Customer System, show me all the sales leads from Mar. 1, 2013 to now". The chatbot "Customer System" lists all the sales leads created from Mar. 1, 2013 to now in the chat session.

Figure 14:
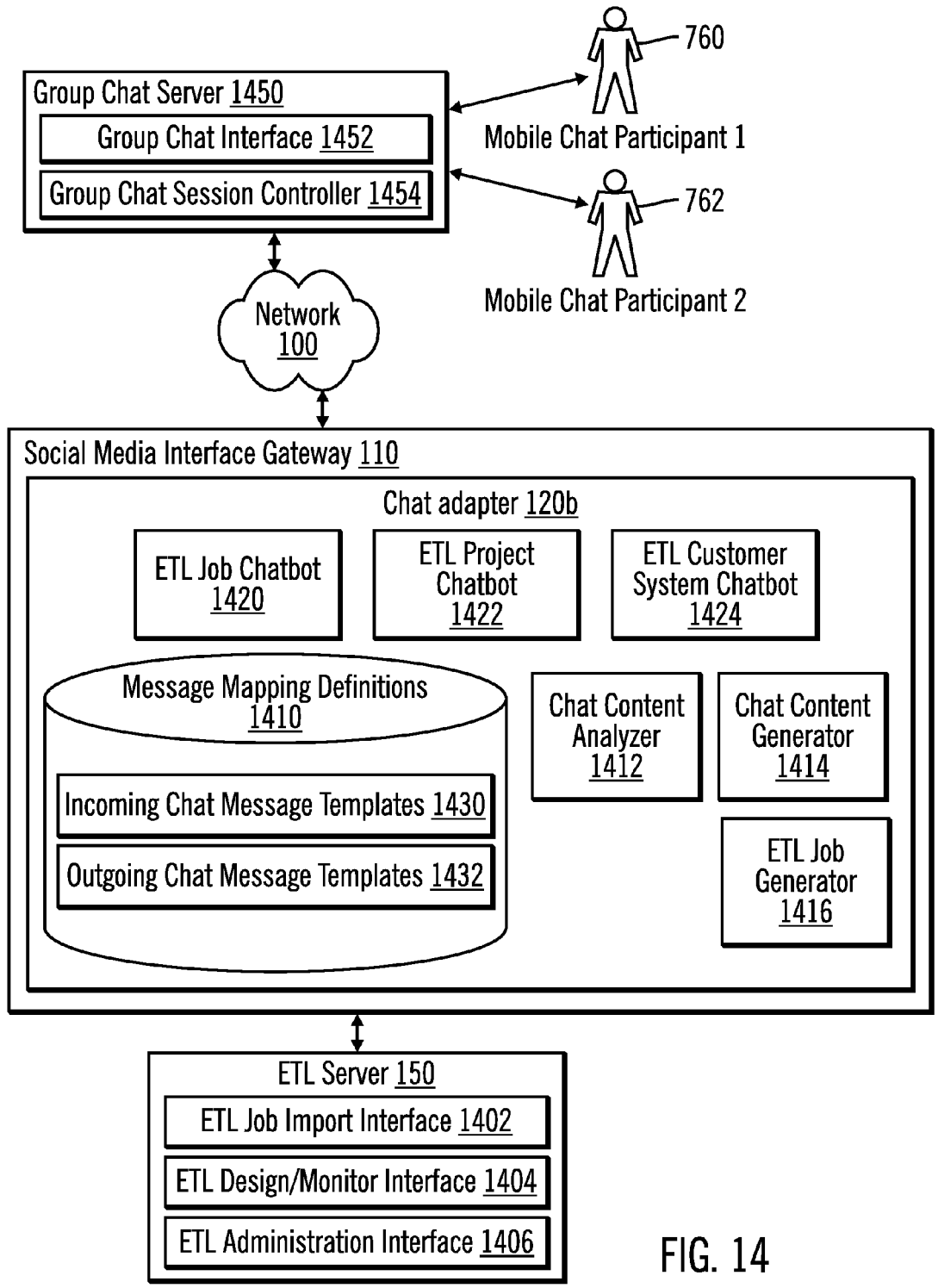
FIG. 14 illustrates components to implement an ETL group chat session in accordance with certain embodiments.

FIG. 14 illustrates components to implement an ETL group chat session in accordance with certain embodiments. Similar components may be used to implement an MDM group chat session in other embodiments.

A group chat server 1450 is responsible for managing on-going group chat sessions and dealing with various concurrent access issues to the group chat session. The group chat server 1450 includes a group chat interface 1452 and a group chat session controller 1454.

A chat adapter 120b (e.g., an ETL group chat adapter) for a chat application is the mediating component between the group chat server 1450 and the ETL server 150. The ETL server 150 includes an ETL job import interface 1402, an ETL design/monitor interface 1404, and an ETL administration interface 1406. The chat adapter 120b includes message mapping definitions 1410 for chatbots, a chat content analyzer 1412, a chat content generator 1414, and an ETL job generator 1416. The message mapping definitions 1410 contain the incoming chat message templates 1430 and outgoing chat message templates 1432.

The chat adapter 120b invokes the ETL design/monitor interface 1404 exposed by the ETL server 150 to design, modify, run, and monitor ETL jobs. The chat adapter 120b may also interface with the ETL administration interface 1406 to perform administration functions. In addition, the chat adapter 120b uses the ETL job import interface 1402 to import an new job into an ETL project. Moreover, the chat adapter 120b personifies the core ETL components, such as ETL projects/jobs and the data sources that the ETL server 150 can access as chatbots and depends on the chatbots to participate in the group chat session.

The virtual chat participants (chatbots) include an ETL job chatbot 1420, an ETL project chatbot 1422, and a customer system chatbot 1424. In certain embodiments, the chatbots 1420, 1422, and 1424 may be implemented as part of the chat adapter 120b. In other embodiments, the chatbots 1420, 1422, and 1424 may be implemented outside of the chat adapter 120b.

The chatbots 1420, 1422, 1424 implement a chat participant interface 1452 and join and participate in a group chat. The group chat server 1450 sends chat updates and notifications and invites chatbots to a group session through the chat participant interface.

For example, to send a message (which may include voice clips, file links, web pages, images, etc.) to a group chat session, a chatbot invokes a group chat interface 1452 exposed by the group chat server 1450. There are two kinds of chatbots: one kind representing various ETL components (such as ETL jobs, projects, etc.) and another kind representing various data sources (such as various databases). The behavior of a chatbot may be described in a state machine. The chatbot moves from one state to other states based on the messages received from the group chat server 1450. At the same time, the chatbot takes actions when moving from one state to another. The code for each chatbot may be generated from the state machine created for the chatbot.

The chat content analyzer 1412 analyzes a chat message and converts the chat message from the group chat server 1450 to a method invocation to a chatbot 1420, 1422, 1424 based on the input chat message templates 1430 for that chatbot. When a chatbot wants to create a chat message, the chatbot uses the chat content generator 1414 to formulate the chat message based on the outgoing chat message templates 1432 for the chatbot.

A message mapping definition 1410 for a chatbot contains the input chat message templates 1430 to define how to map an input message into a method invocation based on pattern matching. The message mapping definition 1410 also contains the outgoing chat message templates 1432 to define an outgoing chat message template 1430 responding to an incoming chat message. The outgoing chat message templates 1432 may bring video clip, image, text, etc. together to create an out-bound chat message. For example, an image may show the design tip at a particular moment when mobile users are modifying a stage instance within an ETL job.

The ETL job generator 1416 is responsible for creating ETL jobs based on user's requirements. The mobile chat participants 1460, 1462 may participate in a group chat session with chatbots 1420, 1422, 1424 via the group chat server 1450.

The following sequence describes how a chatbot may work after receiving a message from the group chat server 1450:

1. A chatbot 1420, 1422, 1424 receives a message from a group chat server 1450.
2. The chatbot 1420, 1422, 1424 converts the message into its own method call using the chat content analyzer 1412 and the input chat message templates 1430 defined for the chatbot.
3. The chatbot 1420, 1422, 1424 performs its tasks in the method call, such as creating another chatbot, creating ETL jobs, calling ETL interfaces, etc.
4. When the chatbot 1420, 1422, 1424 is ready to respond to the message received from the group chat server 1450, the chatbot 1420, 1422, 1424 uses the chat content generator 1414 to formulate a response based on an outgoing chat message template 1419. The chatbot 1420, 1422, 1424 may also attach possible incoming chat message templates 1430 that it can accept next to guide the mobile user's operations.
5. The chatbot 1420, 1422, 1424 sends the response back to the group chat server 1450.

Figure 15:
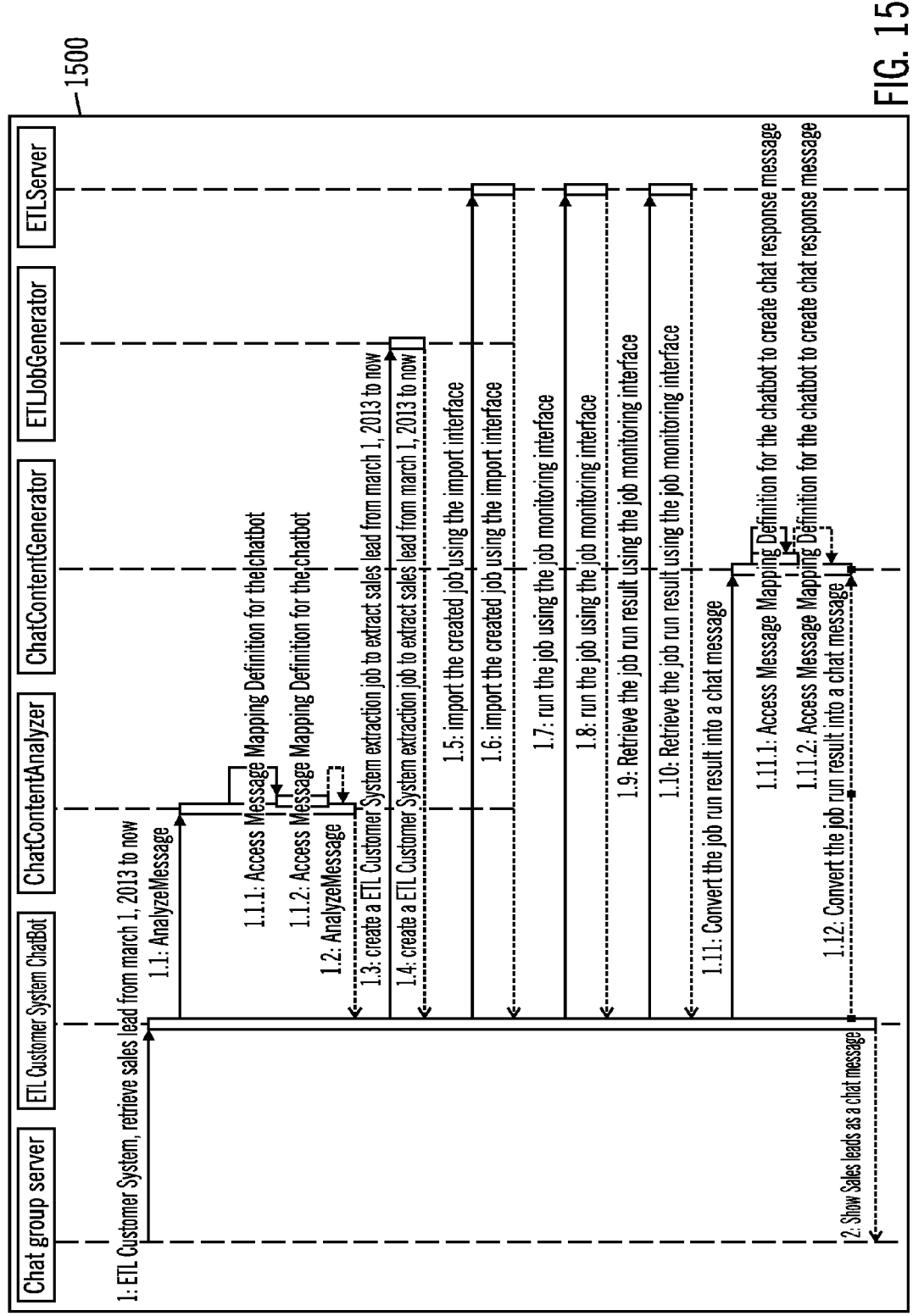
FIG. 15 illustrates flow between components in accordance with certain embodiments.

FIG. 15 illustrates flow 1500 between components in the FIG. 14 in accordance with certain embodiments. In particular, FIG. 15 illustrates how pieces are put together to retrieve sales leads using a generated ETL job and illustrates results as a chat message from a customer system chatbot.

Figure 16:
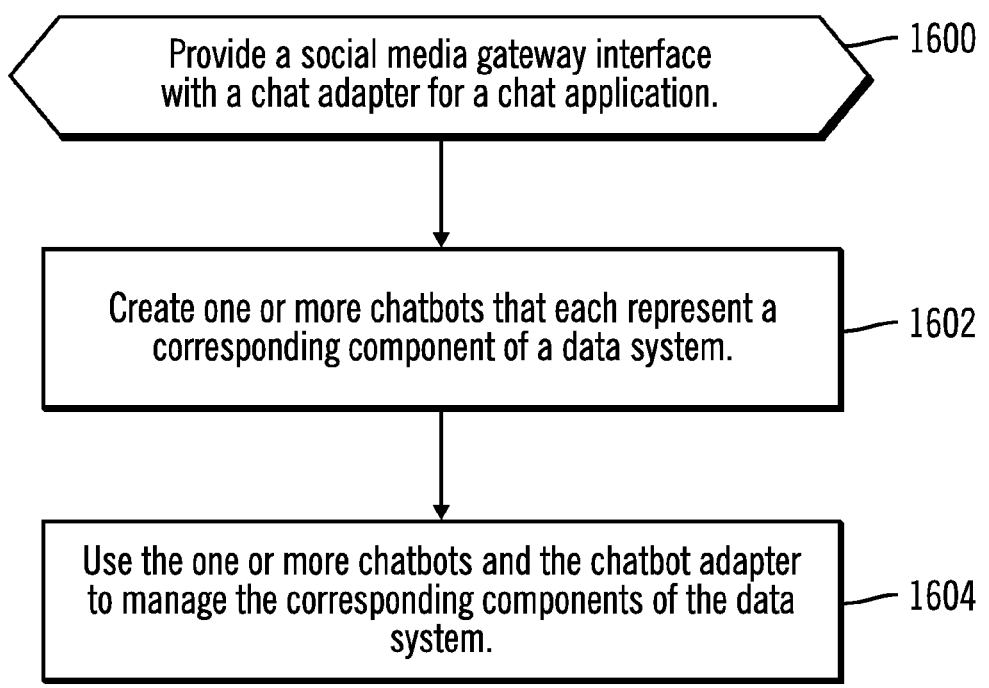
FIG. 16 illustrates, in a flow diagram, operations for personifying data system components using chatbots in accordance with certain embodiments.

FIG. 16 illustrates, in a flow diagram, operations for personifying data system components using chatbots in accordance with certain embodiments. Control begins at block 1600 with a social media gateway interface with a chat adapter for a chat application being provided. In block 1602, one or more chatbots that each represents a corresponding component of a data system are created. In block 1604, the one or more chatbots and the chatbot adapter are used to manage the corresponding components of the data system.

Embodiments enable managing components of a data system by creating one or more virtual chat participants (e.g., chatbots) of a social media environment (e.g., chat session) each representing a corresponding component of the data system and interacting with the virtual chat participants in the social media environment to manage the corresponding components of the data system. The virtual chat participants include chatbots (chat robots) to receive and process requests within the social media environment for corresponding components of the data system. A mobile device may be used to access the social media environment and interact with the virtual chat participants. The virtual chat participants may represent data sources. A customer support agent may be invited to join the social media environment to address a problem with the data system. The virtual chat participants may interact with each other to perform data operations to manage the corresponding components of the data system.

Figure 17:
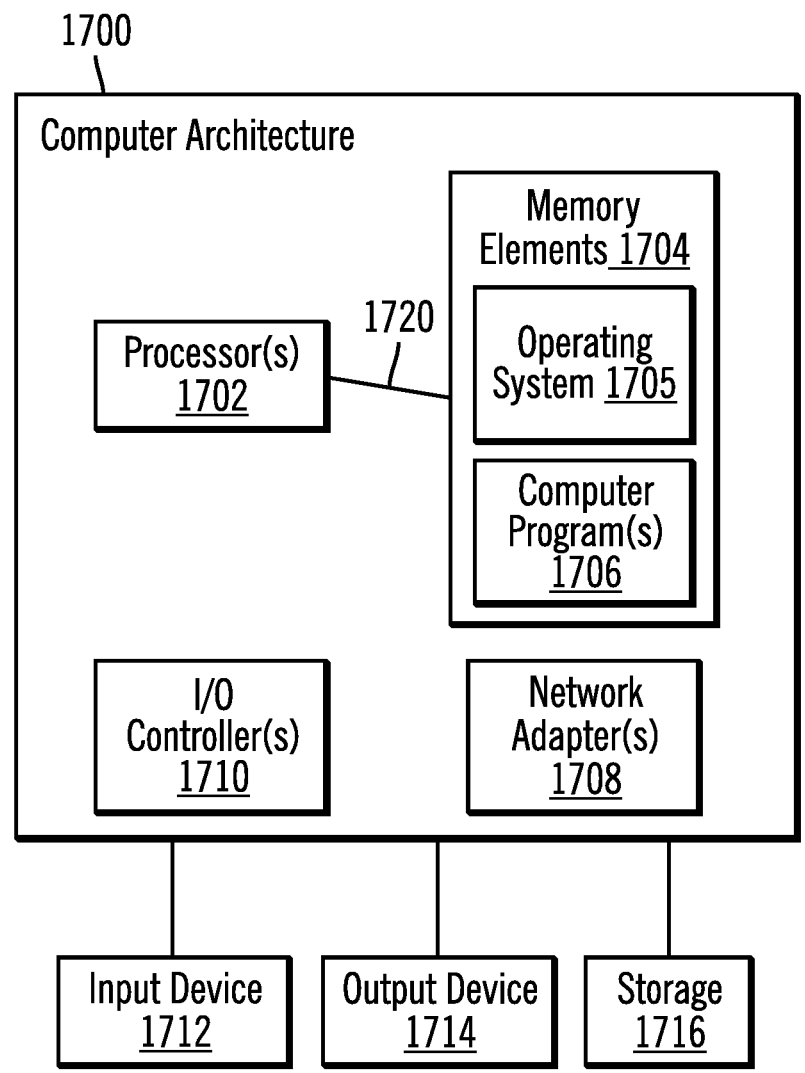
FIG. 17 illustrates, in a block diagram, a computer architecture that may be used in accordance with certain embodiments.

FIG. 17 illustrates a computer architecture 1700 that may be used in accordance with certain embodiments. In certain embodiments, the social media interface gateway 110, the event gateway 130, the ETL server 150, and/or the MDM server 160 may implement computer architecture 1700. The computer architecture 1700 is suitable for storing and/or executing program code and includes at least one processor 1702 coupled directly or indirectly to memory elements 1704 through a system bus 1720. The memory elements 1704 may include local memory employed during actual execution of the program code, bulk storage, and cache memories which provide temporary storage of at least some program code in order to reduce the number of times code must be retrieved from bulk storage during execution. The memory elements 1704 include an operating system 1705 and one or more computer programs 1706.

Input/Output (I/O) devices 1712, 1714 (including but not limited to keyboards, displays, pointing devices, etc.) may be coupled to the system either directly or through intervening I/O controllers 1710.

Network adapters 1708 may also be coupled to the system to enable the data processing system to become coupled to other data processing systems or remote printers or storage devices through intervening private or public networks. Modems, cable modem and Ethernet cards are just a few of the currently available types of network adapters 1708.

The computer architecture 1700 may be coupled to storage 1716 (e.g., any type of storage device; a non-volatile storage area, such as magnetic disk drives, optical disk drives, a tape drive, etc.). The storage 1716 may comprise an internal storage device or an attached or network accessible storage. Computer programs 1706 in storage 1716 may be loaded into the memory elements 1704 and executed by a processor 1702 in a manner known in the art.

The computer architecture 1700 may include fewer components than illustrated, additional components not illustrated herein, or some combination of the components illustrated and additional components. The computer architecture 1700 may comprise any computing device known in the art, such as a mainframe, server, personal computer, workstation, laptop, handheld computer, telephony device, network appliance, virtualization device, storage controller, etc.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
providing, with a processor of a computer, a social media gateway interface with a chat adapter for a chat application, wherein the chat adapter comprises (1) an Extract Transform and Load (ETL) job chatbot for accessing a data system and (2) message mapping definitions, wherein the data system comprises an ETL server;
receiving from a group chat server, a request to start a chat session;
creating a chat session between a mobile chat participant using the chat application and the ETL job chatbot; and
in response to receiving a chat message from the mobile chat participant, converting the chat message to a method invocation for the chatbot using the message mapping definitions;
executing a request of the converted chat message with the chatbot to generate a response chat message by:
selecting an interface of a plurality of interfaces of the data system based on the converted chat message, wherein the plurality of interfaces comprise a first interface to import an ETL job and a second interface to design and monitor the ETL job;
calling the selected interface to obtain the response; and
returning the response chat message.

2. The computer-implemented method of claim 1, wherein additional chatbots receive and process requests within the chat session for each corresponding component of the data system.

3. The computer-implemented method of claim 1, wherein the data system includes one of the ETL server, a Master Data Management (MDM) server, a data store, and a data warehouse.

4. The computer-implemented method of claim 1, wherein the message mapping definitions comprise incoming chat message templates to analyze incoming chat messages and outgoing chat message templates to create outgoing chat messages.

5. The computer-implemented method of claim 1, further comprising:
interacting with additional chatbots via a mobile device.

6. The computer-implemented method of claim 1, wherein additional chatbots represent data sources.

7. The computer-implemented method of claim 1, further comprising:
inviting a customer support agent to join the chat session to address a problem with the data system.

8. The computer-implemented method of claim 1, wherein additional chatbots interact with each other to manage each corresponding component of the data system.

9. The computer-implemented method of claim 1, further comprising:
managing the ETL job, wherein managing the ETL job comprises creating the ETL job, modifying the ETL job, inspecting the ETL job or running the ETL job.

10. The computer-implemented method of claim 1, further comprising:
managing a project, wherein managing the project comprises creating the project, modifying the project, inspecting the project or running the project.

\* \* \* \* \*